(12) United States Patent
Hirata et al.

(10) Patent No.: US 9,738,192 B2
(45) Date of Patent: Aug. 22, 2017

(54) SEAT PAD AND SEAT FOR VEHICLE

(71) Applicant: BRIDGESTONE CORPORATION, Tokyo (JP)

(72) Inventors: Yutaka Hirata, Sagamihara (JP); Masanori Okumura, Nabari (JP); Taisuke Yonezawa, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 628 days.

(21) Appl. No.: 13/969,928

(22) Filed: Aug. 19, 2013

(65) Prior Publication Data
US 2013/0328377 A1 Dec. 12, 2013

Related U.S. Application Data

(62) Division of application No. 12/670,307, filed as application No. PCT/JP2008/063214 on Jul. 23, 2008, now abandoned.

(30) Foreign Application Priority Data

Jul. 23, 2007 (JP) .................................. 2007-190967
Dec. 14, 2007 (JP) .................................. 2007-323520
Jun. 13, 2008 (JP) .................................. 2008-155503

(51) Int. Cl.
*B60N 2/64* (2006.01)
*B60N 2/015* (2006.01)
*B60N 2/30* (2006.01)

(52) U.S. Cl.
CPC ......... *B60N 2/646* (2013.01); *B60N 2/01508* (2013.01); *B60N 2/3097* (2013.01)

(58) Field of Classification Search
USPC ............ 297/452.15, 452.21, 452.45, 452.47; 5/730
See application file for complete search history.

(56) References Cited

U.S. PATENT DOCUMENTS 654,720 A * 7/1900 Englebert ..................... 297/202
2,047,616 A 7/1936 Church
(Continued)

FOREIGN PATENT DOCUMENTS

GB 2 076 648 A 12/1981
GB 2 441 471 A 3/2008
(Continued)

OTHER PUBLICATIONS

European Search Report issued in European Application No. 08791471.9 dated Jul. 5, 2011.
(Continued)

*Primary Examiner* — David E Allred
(74) *Attorney, Agent, or Firm* — Sughrue Mion, PLLC

(57) ABSTRACT

Ridge portions 9 are provided to be continuously present in orthogonally intersecting directions by forming plural recessed holes 8 in the upper surface of an under-thighs portion 2 and an under-buttocks portion 3 of a seat pad 1 for a vehicle. The height of each ridge portion 9, i.e. the depth h of each recessed hole 8, is preferably in the range of 2 to 40 mm, more preferably in the range of 5 to 20 mm, the width w of each recessed hole 8 is preferably in the range of 10 to 30 mm, more preferably in the range of 20 to 30 mm, and the area of an opening of each recessed hole 8 is preferably in the range of 50 to 1000 mm$^2$, more preferably in the range of 100 to 900 mm$^2$. Accordingly, the present invention can provide a seat pad, which is excellent in soft sensation of touch of a surface thereof, satisfactory in the properties of supporting an occupant, and can be produced by integral foam molding.

5 Claims, 15 Drawing Sheets

(56) References Cited

U.S. PATENT DOCUMENTS

| | | | |
|---|---|---|---|
| 2,135,657 | A | 11/1938 | Church |
| 2,552,039 | A | 5/1951 | Flogaus |
| 2,750,996 | A | 6/1956 | Cramer |
| 2,763,013 | A | 9/1956 | Van Valkenburgh |
| 3,111,345 | A | 11/1963 | Peras |
| 3,331,089 | A | 7/1967 | Ornas, Jr. |
| 3,828,378 | A | 8/1974 | Flam |
| 4,092,751 | A | 6/1978 | Burkholder et al. |
| 4,335,476 | A | 6/1982 | Watkin |
| 4,383,342 | A | 5/1983 | Forster |
| 4,793,574 | A | 12/1988 | Fenske et al. |
| 4,837,881 | A | 6/1989 | Kondo et al. |
| 4,955,096 | A | 9/1990 | Gilroy et al. |
| 5,077,849 | A | 1/1992 | Farley |
| 5,083,335 | A | 1/1992 | Krouskop et al. |
| 5,111,542 | A | 5/1992 | Farley |
| 5,251,963 | A | 10/1993 | Inayoshi et al. |
| 5,294,181 | A | 3/1994 | Rose et al. |
| 5,639,145 | A | 6/1997 | Alderman |
| 5,816,661 | A | 10/1998 | Sakurai et al. |
| 6,003,179 | A | 12/1999 | Farley |
| 6,848,138 | B1 | 2/2005 | Maier et al. |
| 6,874,185 | B1 * | 4/2005 | Phillips et al. ............... 5/730 |
| 6,941,603 | B2 | 9/2005 | Radice |
| 7,406,733 | B2 | 8/2008 | Coffield et al. |
| 7,661,764 | B2 | 2/2010 | Ali et al. |
| 7,712,837 | B2 * | 5/2010 | Ekornes ............... 297/452.53 |
| 8,162,402 | B2 | 4/2012 | Yamauchi |
| 8,359,689 | B2 | 1/2013 | Warren et al. |
| 2002/0178505 | A1 | 12/2002 | Kienlein |
| 2004/0200003 | A1 | 10/2004 | Kuo |
| 2004/0250349 | A1 | 12/2004 | Rene |
| 2005/0017396 | A1 | 1/2005 | Pearce et al. |
| 2005/0115003 | A1 | 6/2005 | Torbet et al. |
| 2008/0030062 | A1 | 2/2008 | Prust |
| 2008/0054702 | A1 | 3/2008 | Ali et al. |
| 2008/0290716 | A1 | 11/2008 | Ekornes |
| 2009/0222996 | A1 | 9/2009 | Balonick et al. |
| 2010/0269262 | A1 * | 10/2010 | Warren et al. ............... 5/690 |

FOREIGN PATENT DOCUMENTS

| | | |
|---|---|---|
| JP | 60-79391 U | 6/1985 |
| JP | 4-19254 U | 2/1992 |
| JP | 09-271423 A | 10/1997 |
| JP | 11-348629 A | 12/1999 |
| JP | 2002-153357 A | 5/2002 |
| JP | 2002-369733 A | 12/2002 |
| WO | 99/08571 A1 | 2/1999 |
| WO | 2006/102751 A1 | 10/2006 |
| WO | 2007/053035 A1 | 5/2007 |

OTHER PUBLICATIONS

Chinese Office Action issued in Chinese Application No. 200880107093.0 dated Dec. 7, 2011.

Chinese Office Action issued in Chinese Application No. 200880107093.0 dated Jul. 11, 2012.

International Search Report for PCT/JP2008/063214, dated Oct. 7, 2008, 4 pages.

Chinese Office Action issued Nov. 14, 2014 in Chinese Patent Application No. 201210484611.9.

* cited by examiner

SEAT PAD AND SEAT FOR VEHICLE

CROSS REFERENCE TO RELATED APPLICATIONS

This application is a divisional of U.S. application Ser. No. 12/670,307, filed Mar. 1, 2010, which is a National Stage of International Application No. PCT/JP2008/063214, filed on Jul. 23, 2008, which claims priority from Japanese Patent Application No. 2007-190967, filed Jul. 23, 2007, Japanese Patent Application No. 2007-323520, filed Dec. 14, 2007 and Japanese Patent Application No. 2008-155503, filed Jun. 13, 2008, the contents of all of which are incorporated herein by reference in their entirety.

TECHNICAL FIELD

The present invention relates to a seat pad for a vehicle and a seat for a vehicle and, in particular, to a seat pad for a vehicle and a seat for a vehicle each having a passenger contact surface made to have soft sensation of touch or good sensation of the pad making a stroke movement.

PRIOR ART

A seat pad mounted to a vehicle seat or the like is conventionally manufactured by pouring an urethane blend raw liquid prepared by blending a polyol component blend liquid and an isocyanate component, into a mold, and then foam molding the urethane blend raw liquid.

In a seat pad for a vehicle, an under-thighs portion and an under-buttocks portion, which are brought into direct contact with buttocks, back or the like of an occupant, receives a large portion of the weight of an occupant and thus a material of these portions closely affects sitting comfort and riding comfort.

In view of this, there have been proposed various types of seat cushion pads for a vehicle, in which modifications are made including increasing density of a sitting surface which most affects sitting comfort, while decreasing density of other portions thereof.

For example, JP 2002-153357 discloses a seat cushion pad for a vehicle, in which at least a part of the portions other than an under-buttocks portions of a sitting surface is structured to have lower density than and substantially equal hardness to the under-buttocks portion. However, effecting foam molding by using materials of different types is costly.

Further, there has conventionally been used a seat pad for a vehicle, in which a slab urethane foam is pasted on a pad main body (e.g. JP 9-271423). However, pasting a slab on a pad main body is costly.

JP 11-348629 discloses improving soft sensation of touch, of a surface of an under-buttocks portion of a seat pad made of polyurethane foam, by providing the surface with slits having 5 mm depth in the longitudinal and widthwise directions with 50 mm intervals therebetween.

However, JP 11-348629 judges, as shown in FIGS. 3 and 4 thereof, that the pad surface thereof is soft by pressing a load applying means having 50 mm diameter against the pad surface and measuring the hardness thereof. When buttocks and/or thighs of an occupant are in contact with the pad surface, the aforementioned slits of the pad surface hardly contribute to the occupant's feeling soft sensation of touch and thus improvement of soft sensation of touch is not satisfactory.

DISCLOSURE OF THE INVENTION

Problems to be Solved by the Invention

An object of the present invention is to enable integrally producing a seat pad for a vehicle by foam molding, which seat pad is excellent in soft sensation of touch or sensation of the pad making a stroke movement and exhibits satisfactory supporting properties of an occupant. Another object of the present invention is to provide a seat for a vehicle having such a seat pad for a vehicle as described above.

Means for Solving the Problems

In a first aspect of the present invention, a seat pad formed by a resin foam molding body, for use in a vehicle, comprises ridge portions having flat top surfaces and provided to be continuously present in plural directions, the ridge portions being provided between a number of recessed holes formed at least in a part of an occupant contact surface area of the seat pad.

In a second aspect of the present invention, the seat pad for a vehicle as recited in the first aspect is characterized in that the total of areas of the top surfaces of the respective ridge portions thereof constitute 20 to 80% of the total area of the recessed holes and the ridge portions.

In a third aspect of the present invention, the seat pad for a vehicle as recited in the second aspect is characterized in that the total of areas of the top surfaces of the respective ridges portions thereof constitute 20 to 50% of the total area of the recessed holes and the ridge portions.

In a fourth aspect of the present invention, the seat pad for a vehicle as recited in any of the first to third aspects is characterized in that the depth of each recessed hole is in the range of 2 to 40 mm.

In a fifth aspect of the present invention, the seat pad for a vehicle as recited in the fourth aspect is characterized in that the depth of each recessed hole is in the range of 5 to 20 mm.

In a sixth aspect of the present invention, the seat pad for a vehicle as recited in any of the first to fifth aspects is characterized in that the area of an opening of each recessed hole is in the range of 50 to 1000 $mm^2$ and the width of each ridge portion is in the range of 2 to 10 mm.

In a seventh aspect of the present invention, the seat pad for a vehicle as recited in the sixth aspect is characterized in that the area of an opening of each recessed hole is in the range of 100 to 900 $mm^2$ and the width of each ridge portion is in the range of 2 to 10 mm.

In an eighth aspect of the present invention, the seat pad for a vehicle as recited in any of the first to seventh aspects is characterized in that the recessed holes and the ridge portions are provided at least in an under-thighs portion of the seat pad.

In a ninth aspect of the present invention, the seat pad for a vehicle as recited in any of the first to eighth aspects is characterized in that the ridge portions are provided to be continuously present in two intersecting directions.

In a tenth aspect of the present invention, the seat pad for a vehicle as recited in the ninth aspect is characterized in that the ridge portions are provided to be continuously present in two orthogonally intersecting directions.

In an eleventh aspect of the present invention, the seat pad for a vehicle as recited in the tenth aspect is characterized in that each recessed hole has a square shape.

In a twelfth aspect of the present invention, the seat pad for a vehicle as recited in any of the first to eighth aspects is characterized in that the ridges are provided to be continuously present in three directions.

In a thirteenth aspect of the present invention, the seat pad for a vehicle as recited in the twelfth aspect is characterized in that each recessed hole has a triangular, polygonal, circular or substantially ellipsoidal shape.

In a fourteenth aspect of the present invention, the seat pad for a vehicle as recited in the twelfth aspect is characterized in that each recessed hole has a hexagonal shape.

In a fifteenth aspect of the present invention, a seat pad formed by a resin foam molding body, for use in a vehicle, comprises plural recessed holes formed at least in a part of an occupant contact surface area or a part of the rear surface area opposite to the occupant contact surface of the seat pad.

In a sixteenth aspect of the present invention, the seat pad for a vehicle as recited in the fifteenth aspect is characterized in that the depth of each recessed hole is in the range of 2 to 40 mm.

In a seventh aspect of the present invention, the seat pad for a vehicle as recited in the fifteenth or sixteenth aspect is characterized in that the area of an opening of each recessed hole is in the range of 50 to 1000 mm$^2$.

In an eighteenth aspect of the present invention, the seat pad for a vehicle as recited in any of the fifteenth to seventeenth aspects is characterized in that each recessed hole has a triangular, square, polygonal, circular or elongated hole-like shape.

In a nineteenth aspect of the present invention, the seat pad for a vehicle as recited in any of the fifteenth to eighteenth aspects is characterized in that portions between the recessed holes constitute ridge portions.

In a twentieth aspect of the present invention, the seat pad for a vehicle as recited in the nineteenth aspect is characterized in that the width of each ridge portion is in the range of 2 to 10 mm.

In a twenty-first aspect of the present invention, the seat pad for a vehicle as recited in the nineteenth or twentieth aspect is characterized in that the ridge portions are provided to be continuously present in two intersecting directions.

In a twenty-second aspect of the present invention, the seat pad for a vehicle as recited in the nineteenth or twentieth aspect is characterized in that the ridge portions are provided to be continuously present in three directions.

In a twenty-third aspect of the present invention, the seat pad for a vehicle as recited in the twenty-second aspect is characterized in that each recessed hole has a hexagonal shape.

In a twenty-fourth aspect of the present invention, the seat pad for a vehicle as recited in any of the nineteenth to twenty-third aspects is characterized in that a volume rate of the ridge portions in a region where the recessed holes and the ridge portions are provided is in the range of 10 to 80%.

In a twenty-fifth aspect of the present invention, the seat pad for a vehicle as recited in twenty-fourth aspect is characterized in that the volume rate of the ridge portions is in the range of 40 to 60%.

In a twenty-sixth aspect of the present invention, the seat pad for a vehicle as recited in any of the nineteenth to twenty-fifth aspects is characterized in that the ridge portions have flat top surfaces.

In a twenty-seventh aspect of the present invention, the seat pad for a vehicle as recited in any of the nineteenth to twenty-sixth aspects is characterized in that at least one of a corner edge where the top surface and a side surface of each ridge portion intersects each other and a corner edge where a side surface of each ridge portion and the bottom surface of an adjacent recessed hole intersects each other has a curved surface.

In a twenty-eighth aspect of the present invention, the seat pad for a vehicle as recited in any of the nineteenth to twenty-sixth aspects is characterized in that a sectional area of an opening of each recessed hole remains substantially unchanged from an entrance portion to the deepest bottom portion thereof.

In a twenty-ninth aspect of the present invention, the seat pad for a vehicle as recited in any of the nineteenth to twenty-seventh aspects is characterized in that a sectional area of an opening on the deeper side of the each recessed hole is smaller than a sectional area of the opening on the entrance side of the recessed hole.

In a thirtieth aspect of the present invention, the seat pad for a vehicle as recited in any of the first to twenty-ninth aspects is characterized in that the seat pad is formed of polyurethane foam having density of 20 to 100 kg/cm$^3$, 25% ILD hardness of 5 to 45 kgf/200 mm$\phi$.

In a thirty-first aspect of the present invention, the seat pad for a vehicle as recited in the thirtieth aspect is characterized in that the seat pad is formed of polyurethane foam having density of 35 to 100 kg/cm$^3$, 25% ILD hardness of 15 to 45 kgf/200 mm$\phi$.

In a thirty-second aspect of the present invention, the seat pad for a vehicle as recited in any of the fifteenth to thirty-first aspects is characterized in that the recessed holes are formed at least in a part of an occupant contact surface area.

In a thirty-third aspect of the present invention, the seat pad for a vehicle as recited in the thirty-second aspect is characterized in that the seat pad is a seat cushion pad, in which a corner edge region where a sitting surface and a front surface thereof intersect each other lacks the recess holes.

In a thirty-fourth aspect of the present invention, the seat pad for a vehicle as recited in the thirty-third aspect is characterized in that the corner edge region is a region having a radius of curvature of 100 mm or less.

In a thirty-fifth aspect of the present invention, the seat pad for a vehicle as recited in any of the thirty-second to thirty-fourth aspects is characterized in that the recessed holes are provided at least in an under-thighs portion of the seat pad.

In a thirty-sixth aspect of the present invention, the seat pad for a vehicle as recited in the thirty-five aspect is characterized in that the recessed holes are formed such that a portion under the right thigh, of the under-thighs portion, is softer than other portions of the under-thighs portion.

In a thirty-seventh aspect of the present invention, the seat pad for a vehicle as recited in any of the thirty-second to thirty-fourth aspects is characterized in that the recessed holes are formed only in a portion under the right thigh, of the seat pad.

In a thirty-eighth aspect of the present invention, the seat pad for a vehicle as recited in any of the thirty-second to thirty-seventh aspects is characterized in that the recessed holes are formed in a front surface which is to face the lower parts of legs of an occupant.

In a thirty-ninth aspect of the present invention, the seat pad for a vehicle as recited in any of the fifteenth to thirty-first aspects is characterized in that the recessed portions are formed at least in a part of the rear surface area opposite to the occupant contact surface.

In a fortieth aspect of the present invention, the seat pad for a vehicle as recited in the thirty-ninth aspect is characterized in that the recessed holes are formed at least in a bottom surface below the under-thighs portion.

In a forty-first aspect of the present invention, the seat pad for a vehicle as recited in the fortieth aspect is characterized in that the recessed holes are formed such that a portion under the right thigh, of the under-thighs portion, is softer than other portions of the under-thighs portion.

In a forty-second aspect of the present invention, the seat pad for a vehicle as recited in the thirty-ninth aspect is characterized in that the recessed holes are formed only in the bottom portion below the portion under the right thigh, of the seat pad.

In a forty-third aspect of the present invention, a seat for a vehicle, having a cushion pad and a back pad constituted of the seat pad as recited in the thirty-second to thirty-fourth aspects, is characterized in that recessed holes in the back pad is deeper than recessed holes in the cushion pad.

In a forty-fourth aspect of the present invention, the seat for a vehicle as recited in the forty-third aspect is characterized in that the recessed holes are formed at least in an under-thighs portion of the cushion pad and a back contact portion of the back pad.

In a forty-fifth aspect of the present invention, a seat for a vehicle, having a cushion pad and a back pad constituted of the seat pad as recited in the thirty-ninth aspect, is characterized in that recessed holes in the back pad is deeper than recessed holes in the cushion pad.

In a forty-sixth aspect of the present invention, the seat for a vehicle as recited in the forty-fifth aspect is characterized in that the recessed holes are formed at least in a bottom surface below an under-thighs portion of the cushion pad and a rear surface behind a back contact portion of the back pad.

Effect of the Invention

In the seat pad for a vehicle as recited in a first embodiment of the present invention, a number of recessed holes are formed at least in a part of an occupant contact surface area of the seat pad, whereby the ridge portions are provided between the recessed holes so as to be continuously present in plural directions. As a result of provision of the ridge portions, soft sensation of touch, of the occupant contact surface, improves because the ridge portions are compression-deformed when an occupant is in contact with the occupant contact surface, as compared with the case where the recessed holes are not provided. In a state where the ridge portions are compression-deformed beyond the predetermined degree, repellent force of the ridge portions increases and an occupant is firmly supported.

In the seat pad for a vehicle of the present invention, not independent projections but the ridge portions are provided so as to be continuously present in plural directions. Since the ridge portions do not suffer from buckling even when the ridge portions are significantly compression-deformed due to the weight of an occupant, good sitting comfort can be obtained.

Sitting comfort improves by setting the depth of each recessed hole in the range of 2 to 40 mm, more preferably in the range of 5 to 20 mm.

Good sitting comfort can be obtained by setting the area of an opening of each recessed hole in the range of 50 to 1000 mm$^2$, more preferably in the range of 100 to 900 mm$^2$, and the width of each ridge portion in the range of 2 to 10 mm.

Soft sensation of touch, of the occupant contact surface, can be obtained in a satisfactory manner by setting the total of areas of the top surfaces of the respective ridge portions to constitute 20 to 80%, more preferably 20 to 50%, of the total area of the recessed holes and the ridge portions.

The configurations of cavity surfaces of a mold can be made simple and an occupant is less likely to feel poor sitting comfort due to a wrong extending direction of the ridge portions, by providing the ridge portions in two intersecting directions, in particular, in two orthogonal directions.

The ridge portions can be provided to be continuously present or extend in two orthogonal directions in a lattice-like manner by shaping each recessed hole to be square.

The ridge portions may be continuously present in more than two directions. In this case, the shape of each recessed hole may be any of triangular, polygonal, circular, substantially circular and the like.

The ridge portions can be provided to continuously and linearly extend in intersecting three directions by shaping each recessed hole to be hexagonal and arranging the respective recessed holes in a honeycomb-like structure, so that an occupant is less likely to feel poor sitting comfort due to a wrong extending direction of the ridge portions. Further, foaming raw liquid is facilitated to enter the portions to form the ridge portions, in a cavity surface of a mold, by forming the ridge portions to be continuously present in three intersecting directions in honeycomb-like structure, whereby there is obtained an effect of enhancing the yield of molding.

The seat pad of the first embodiment of the invention may be either a seat cushion pad or seat back pad.

In the seat pad for a vehicle as recited in a second embodiment of the present invention, plural recessed holes are formed at least in a part of an occupant contact surface area or a part of the rear surface area opposite to the occupant contact surface of the seat pad. As a result, soft sensation of touch or sensation of the pad making a stroke movement improves because the portions between the recessed holes are compression-deformed when an occupant is in contact with the aforementioned areas where the recessed holes are formed. Soft sensation of touch especially improves by forming the recessed holes in the occupant contact surface. In a case where when plural recessed holes are formed at least in a part of the occupant contact surface and a part of the rear surface opposite to the occupant contact surface, satisfactory sensation of the pad making a stroke movement can be obtained when an occupant sits on or leans against the occupant contact surface because the portions between the recessed holes are compression-deformed and make a stroke movement in a manner that the pad recedes backwards. Sensation of the pad making a stroke movement under an occupant's thighs increases by forming the recessed holes in the rear surface below the under-thigh portions of the seat pad.

The seat pad of the second embodiment of the invention may be either a seat cushion pad or seat back pad.

Sitting comfort improves by setting the depth of each recessed hole in the range of 2 to 40 mm.

Satisfactory sitting comfort can be obtained by setting the area of an opening of each recessed hole in the range of 50 to 1000 mm$^2$.

In the seat pad for a vehicle of the present invention, it is preferable to structure portions between the recessed holes not as independent projections but as the ridges continuously present in plural directions. It is particularly preferable that the ridge portions are continuously present in two or three directions. These ridge portions do not suffer from buckling when they are deeply compression-deformed by the weight of an occupant and thus achieve satisfactory sitting comfort.

Further, an occupant is less likely to feel poor sitting comfort due to a wrong extending direction of the ridge portions, by providing the ridge portions to be continuously present in two or three directions.

Further, in a case where the ridge portions are provided to be continuously present in three intersecting directions as described above, foaming raw liquid is facilitated to enter the portions to form the ridge portions, in a cavity surface of a mold, and an effect of enhancing the yield of molding can be obtained, as well.

Good sitting comfort is obtained by setting the width of each ridge portion in the range of 2 to 10 mm.

Odd sensation of touch felt by an occupant when the occupant touches the ridge portions is reduced and thus satisfactory sensation of touch is obtained by making top surfaces of each ridge portion flat.

The shape of each recessed portion may be any of triangle, square, polygon, circle, elongated hole-like shape (e.g. rectangle, oval, elongated groove) and the like.

Satisfactory soft sensation of touch is obtained by setting a volume rate of the ridge portions in a region where the recessed holes and the ridge portions are provided in the range of 10 to 80%. Further, not only satisfactory soft sensation of touch but also satisfactory durability of the ridge portions can be obtained by setting the volume rate of the ridge portions in the range of 40 to 60%.

In a case where the sectional area of an opening of each recessed hole remains substantially unchanged from an entrance portion to the deepest bottom portion thereof, the widths of the ridge portions between the recessed portions remain substantially unchanged from the base end to the tip end, whereby the gradient of a stress-strain curve during compression deformation is relatively gentle and satisfactory sitting comfort is obtained.

In the present invention, durability of the ridge portions or the protruding portions is enhanced by providing a corner edge of each ridge portion or each protruding portion with a curved face.

Soft sensation of touch, of the under-thigh portions of the seat pad, improves by forming the recessed holes in the under-thigh portions or the bottom surface of the seat pad below the under-thigh portions.

In an embodiment of the seat pad for the driver's seat in a vehicle of the present invention, a portion under the right thigh, of the under-thighs portion, is made softer than other portions of the under-thighs portion by forming the recessed holes in the portion under the right thigh, of the under-thighs portion or the bottom surface of the seat pad therebelow. In this embodiment, satisfactory soft sensation of touch is obtained when the occupant, i.e. the driver, presses his/her right thigh upon the seat. The properties of supporting the driver's body are also satisfactory because the portions of the seat pad other than the portion under the right thigh, of the under-thighs portion, are harder than the portion under the right thigh.

The entire part of the under-thighs portion may be made softer than the under-buttocks portion. In this case, the portion under the right thigh, of the under-thighs portion, may be made particularly soft. Soft sensation of touch, of the portion under the left thigh, of the under-thighs portion, is also improved in such a structure.

In an embodiment of the seat pad of the present invention, the surface layer portion of the front surface of the cushion pad is made soft by providing the front surface with protruding portions and recessed portions. These protruding and recessed portions are easily compression-deformed when the lower leg portions, e.g. calves, of an occupant are in contact therewith, whereby the occupant feels soft sensation of touch therewith.

In another embodiment of the seat pad of the present invention, no protruding and recessed portions are provided in a corner edge portion between the sitting surface and the front surface. As a result, protrusions and recesses are not reflected on a cover material in an engraved manner when the cover material is attached to the corner edge. Regarding the sitting surface and the front surface other than the corner edge, protrusions and recesses do not appear therein on the cover material in an engraved manner, if protrusions and recesses exist, because the sitting surface and the front surface are substantially planar.

In an embodiment of the seat pad for a vehicle of the present invention, plural recessed holes are formed at least in a part of the occupant contact surface area or a part of the surface area opposite to the occupant contact surface of a cushion pad and a back pad such that the recessed holes in the back pad are deeper than the recessed holes in the cushion pad. Improved soft sensation of touch or sensation of the pad making a stroke movement, of the occupant contact surface, can be obtained because the portions between the recessed holes are compression-deformed when an occupant is in contact with these areas. Further, satisfactory soft sensation of touch or sensation of the pad making a stroke movement, of the back pad, can be obtained because the recessed holes in the back pad are deeper than the recessed holes in the cushion pad.

Soft sensation of touch or sensation of the pad making a stroke movement, of the under-thighs portion and the back contact portion, improves by forming the recessed holes either in the under-thighs portion and the back contact portion of the seat pad or the bottom surface of the cushion pad below the under-thighs portion and the rear surface of the back pad behind the back contact portion.

BEST MODE FOR IMPLEMENTING THE INVENTION

Figure 1:
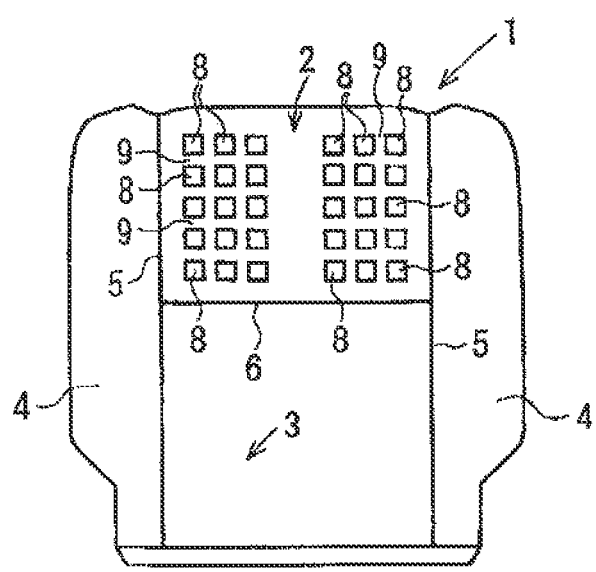
FIG. 1 is a plan view of a seat pad for a vehicle according to an embodiment of the present invention.

An embodiment of the present invention will be described hereinafter with reference to the drawings. In the drawings, the reference numbers 1, 1A, 1B, 1C, 1D and 21 represent a seat pad for a vehicle, 2 represents an under-thighs portion, 3 represents an under-buttocks portion, 7 represents a portion under the right thigh, 8, 10 and 12 represent recessed holes, 9, 9A, 11 and 13 represent ridge portions, 23 represents a pelvis contact portion, and 40 and 50 represent a back pad, of the seat pad.

(Seat Pad for a Vehicle, of which Under-Thighs Portion is Made Soft by Recessed Holes)

Figure 2:
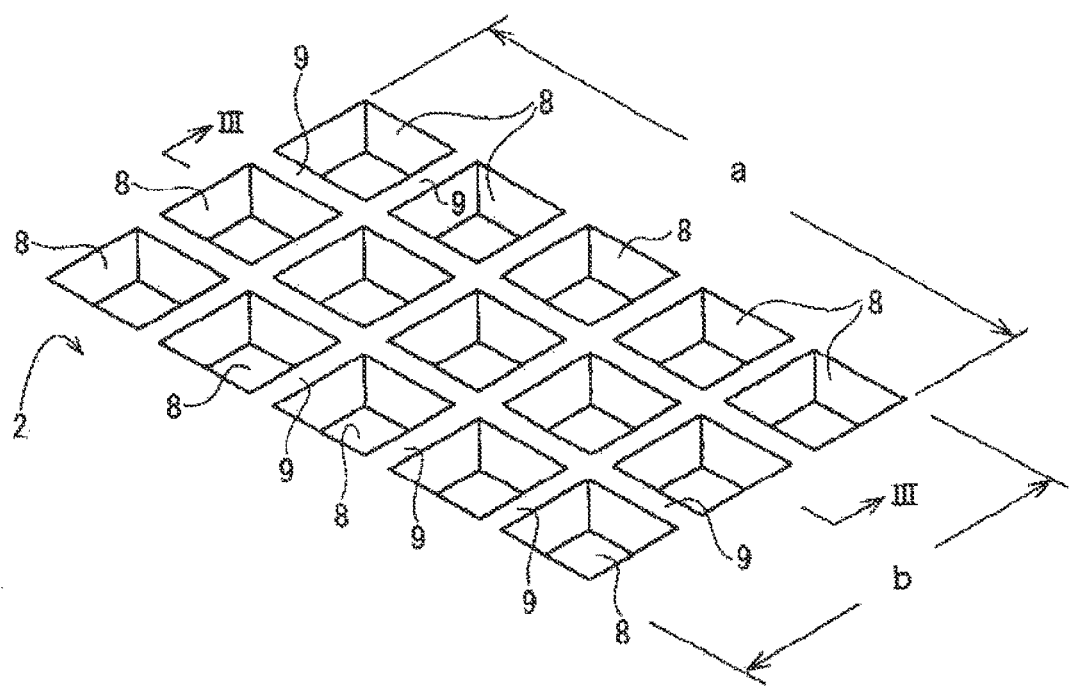
FIG. 2 is an enlarged perspective view of a sitting surface.
Figure 3:
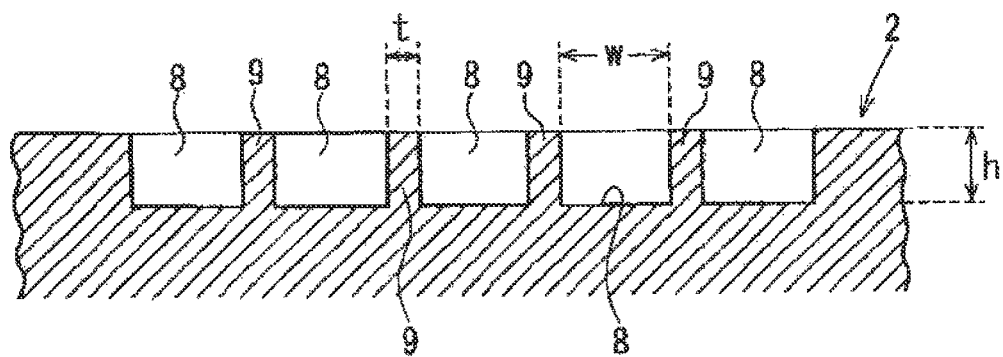
FIG. 3 is a sectional view cut along the line III-III of FIG. 2.

FIG. 1 is a plan view of a seat pad for a vehicle according to an embodiment of the present invention. FIG. 2 is an enlarged perspective view of a sitting surface. FIG. 3 is a sectional view cut along the line III-III of FIG. 2.

The seat pad 1 for a vehicle is formed by polyurethane foam, which is integrally foam molded as a whole. The seat pad 1 includes the under-thighs portion 2, the under-buttocks portion 3 and side portions 4.

In the upper surface of the seat pad 1 for a vehicle, longitudinal fitting grooves 5 and a lateral fitting groove 6 for fitting a cover material (not shown) are formed such that these grooves form a H-like configuration. A portion situated forward of the fitting groove 6 and between the fitting grooves 5 constitutes the under-thighs portion 2, and a portion situated back of the fitting groove 6 and between the fitting grooves 5 constitutes the under-buttocks portion 3.

In the upper surface of the under-thighs portion 2 of the seat pad 1 for a vehicle, plural (in the drawings, a number of) recessed holes 8 are formed so that the ridge portions 9 are provided to be continuously present in the orthogonally intersecting directions. In the present embodiment, a section orthogonal to the sitting surface of each ridge portion 9 has a rectangular shape and the sectional area of an opening of each recessed hole 8 (the sectional area in the direction orthogonal to the depth direction of the recessed hole 8) is unchanged from the entrance portion to the deep bottom portion of the recessed hole. Accordingly, the width t of a section of the ridge portion 9 is constant from the base end (the lower end) to the tip end (the upper end). The ridge portion 9 may have a trapezoidal sectional shape in which the width t decreases toward the tip end. The plan-view configuration of each recessed hole 8 is square in the drawings but may be rectangular.

In the present embodiment, the ridge portions 9 are continuously provided in the front-rear direction and the left-right direction of the seat pad 1 for a vehicle. However, the ridge portions 9 may be continuously provided in the directions inclined by 45° with respect to the front-rear direction. In this case, the shape of the opening of each recessed hole 8 is preferably a square so that the shape of the opening is line-symmetrical. The top surface of each ridge portion 9 is flat, and continuous and flush with the sitting surface surrounding the region where the recessed holes 8 and the ridge portions 9 are provided.

Figure 4:
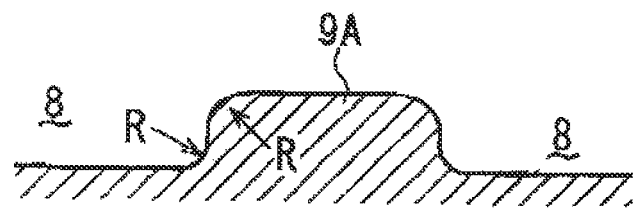
FIG. 4 is a sectional view showing another configuration of a recessed hole and a ridge portion.

The height of each ridge portion 9, i.e. the depth h of each recessed hole 8, is preferably in the range of 2 to 40 mm, more preferably in the range of 5 to 20 mm, and particularly preferably in the range of 10 to 15 mm. The width (thickness) t of each ridge portion 9 is preferably in the range of 2 to 20 mm, more preferably in the range of 4 to 10 mm. The width w of each recessed hole 8 is preferably in the range of 10 to 30 mm, more preferably in the range of 20 to 30 mm. The area of the opening of each recessed hole 8 is preferably in the range 50 to 1000 $mm^2$, more preferably in the range of 100 to 900 $mm^2$, and particularly preferably in the range of 400 to 700 $mm^2$. In a case where the width (thickness) t of each recessed hole 9 changes, for example, in the height direction thereof as shown in FIG. 4, the width (thickness) t of the ridge portion 9, the width w of the recessed hole 8, and the opening area of the recessed hole 8 represent the thickness, the width and the opening area at the middle position in the height direction, respectively.

The total of areas of the top surfaces of the respective ridge portions 9 is preferably in the range of 20 to 80%, more preferably in the range of 20 to 50%, and particularly preferably in the range of 25 to 35%, of the total areas of the recessed holes 8 and the ridge portions 9.

The volume rate of the ridge portions 9 is preferably in the range of 10 to 80%, more preferably in the range of 25 to 70%, and particularly preferably in the range of 40 to 60%, wherein a volume rate of the ridge portions represents a ratio of the volume of the ridge portions 9 with respect to the volume a·b·h obtained by multiplying the area of the region where the ridge portions 9 and the recessed holes 8 are provided (a×b in FIG. 2) with the depth h of the recessed hole 8. Satisfactory soft sensation of touch, of the portion under the right thigh of the seat pad, is obtained by setting the volume rate in the range of 10 to 80%. Further, not only satisfactory soft sensation of touch, of the portion under the right thigh, but also satisfactory durability of the ridge portions can be obtained by setting the volume rate in the range of 40 to 60%.

The seat pad 1 for a vehicle is integrally molded as a whole by using polyurethane foam having density preferably in the range of 20 to 100 $kg/m^3$, more preferably in the range of 35 to 100 $kg/m^3$, and particularly preferably in the range of 60 to 70 $kg/m^3$, and 25% ILD hardness preferably in the range of 5 to 45 kgf/200 mmφ, more preferably in the range of 15 to 45 kgf/200 mmφ, and particularly preferably in the range of 15 to 35 kgf/200 mmφ. The recessed holes 8 are formed by providing a cavity surface, preferably the bottom surface of the cavity, of a mold with a protruding portion.

A cover material (not shown) is then attached to cover the polyurethane molding, whereby a seat pad for a vehicle, as a product, is obtained.

When an occupant sits on the sitting surface of the seat pad 1 for a vehicle structured as described above, only the ridge portions 9 are compression-deformed at the initial stage in which the lower part of the occupant's body is brought into contact with the sitting surface, so that the occupant feels soft sensation of touch. Then, as the occupant's body further sinks and the ridge portions 9 are further compression-deformed, the repellent force of the ridge portions 9 increases strong enough to stably support the occupant's body.

In the present embodiment, the ridge portions 9 are reliably prevented from being buckled when an occupant sits thereon because the ridge portions are continuously provided in two orthogonal directions in a lattice-like structure.

In a case where the width w of each recessed hole 8 and the height h and the width t of each ridge portion 9 are set in the aforementioned ranges, an occupant hardly feels presence of the recessed holes 8 and the ridge portions 9 when he/she sits thereon, whereby good sensation of touch is obtained. Further, sensation of touch is further improved because the top surface of each ridge portion 9 is flat. Yet further, the gradient of a stress-strain curve during compression deformation is gentle because the width t of a section of each ridge portion 9 is unchanged from the base end to the tip end, whereby satisfactory sitting comfort is obtained.

Although the recessed holes 8 and the ridge portions 9 are provided in the under-thighs portion 2 in the present embodiment, the recessed holes 8 and the ridge portions 9 may be provided in both the under-thighs portion 2 and the under-buttocks portion 3 or only one of the under-thighs portion 2 and the under-buttocks portion 3.

(Description of Recess Holes Having Other Configurations)

Although the sectional area of an opening of each recessed hole 8 in the depth direction thereof is constant, a section of each ridge portion 9 orthogonal to the sitting surface is rectangular and the width t of each ridge portion 9 is constant from the base (lower) end to the tip (upper) end in the present embodiment shown in FIGS. 1 to 3, the present invention is not limited thereto. For example, each recessed hole 8 may have a trapezoidal, semicircular, semioval or a U-like sectional shape so that an sectional area of the opening of each recessed hole 8 decreases from the entrance side toward the deep bottom side thereof and the width t of each ridge portion decreases toward the tip end thereof. Further, a corner edge on the base end side or the upper end side of each ridge portion may be provided with a curved surface, as in the ridge portion 9A shown in FIG. 4. Durability of the ridge portion improves by being provided with such a curved surface as described above. The radius of curvature of the curved surface is preferably in the range of 1 to 20 mm, more preferably in the range of 1 to 10 mm. The corner edge on the base end side represents a corner portion connecting a side face of the ridge portion 9A and a bottom surface of an adjacent recessed hole 8, and the corner edge on the tip end side represents a corner edge where a side face of the ridge portion 9A intersects the top surface of the ridge portion 9A. The radius of curvature of the curved surface may be approximately a half of the depth h of the recessed hole. With such a structure as described above, side surfaces of each ridge portion are constituted of only curved surfaces and durability of the ridge portion is further improved.

The plan view configuration of each recessed hole 8 is a square in FIGS. 1 to 3 to make the with t of each ridge portion 9 constant in the longitudinal direction thereof. However, a plan view configuration of each recessed hole may have an elongated shape such as a rectangle, an oval, an elongated groove-like shape, or a polygonal shape such as a triangle or a hexagon, or a circular shape.

Figure 5:
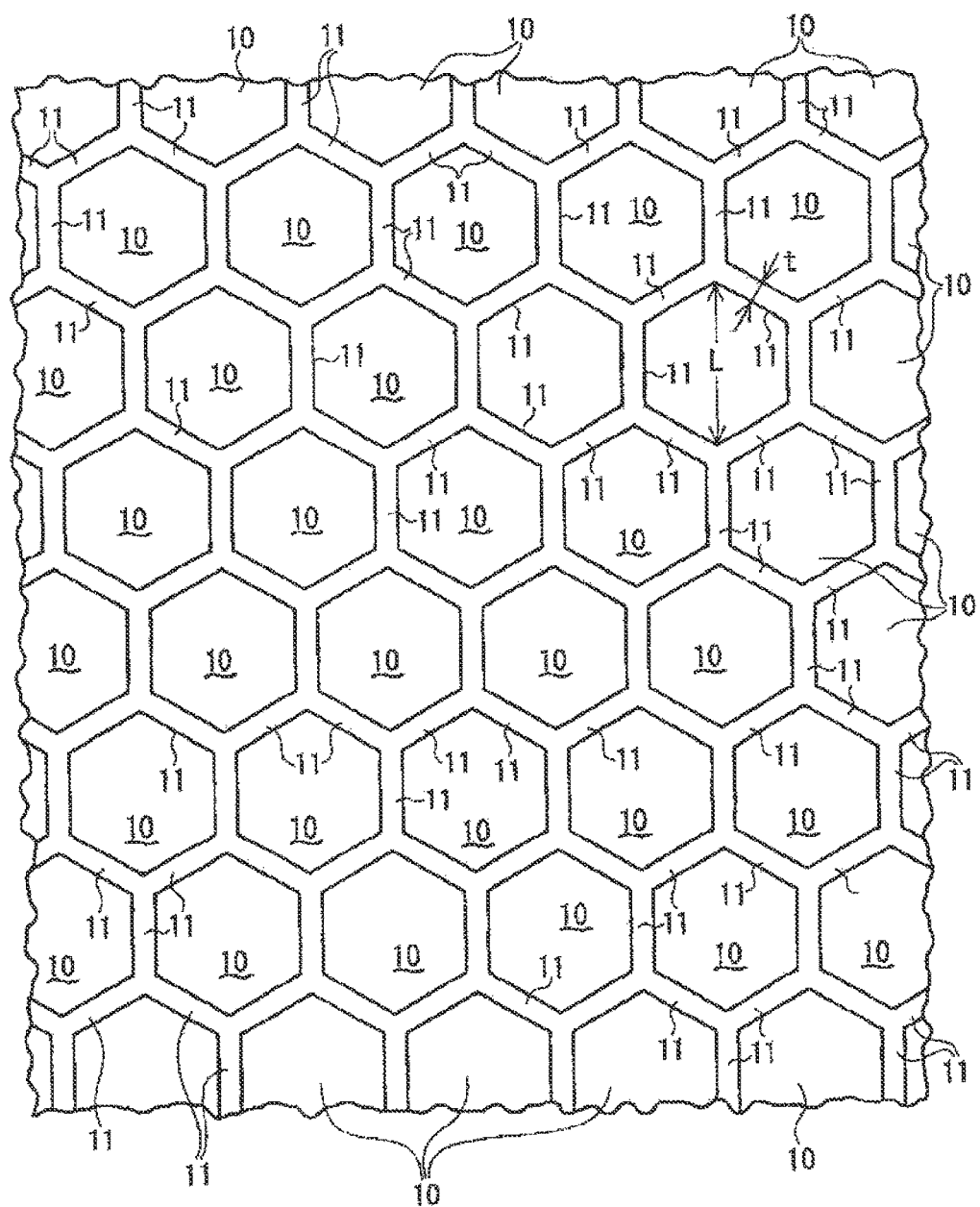
FIG. 5 is a plan view of a part of a bottom surface showing yet another configuration of the recessed and a ridge portion.

In FIG. 5, the recessed holes 10 each having an equilateral hexagonal shape are arranged in a honeycomb structure so that portions between the recessed holes 10 constitute the ridge portions 11.

The width (thickness) t of each ridge portion 11 is preferably in the range of 2 to 20 mm, more preferably in the range of 4 to 10 mm, and the length of the diagonal line of each recessed hole 10 is preferably in the range of 10 to 40 mm, more preferably in the range of 15 to 30 mm. The preferable ranges of the opening area of each recessed hole 10, the height of each ridge portion 11 (the depth of each recessed hole 10) and the portion of the areas of top surfaces of the ridge portions 11, the preferable range of the volume rate of the ridge portions, the preferable material for the seat pad, and the like are similar to those described in the embodiment of FIGS. 1 to 3.

Although each recessed hole has an equilateral hexagonal shape in FIG. 5, the recessed hole may have a hexagonal shape other than an equilateral hexagon. However, a hexagon where opposite sides are parallel to each other are preferable and an equilateral hexagon is the most preferable.

Figure 6:
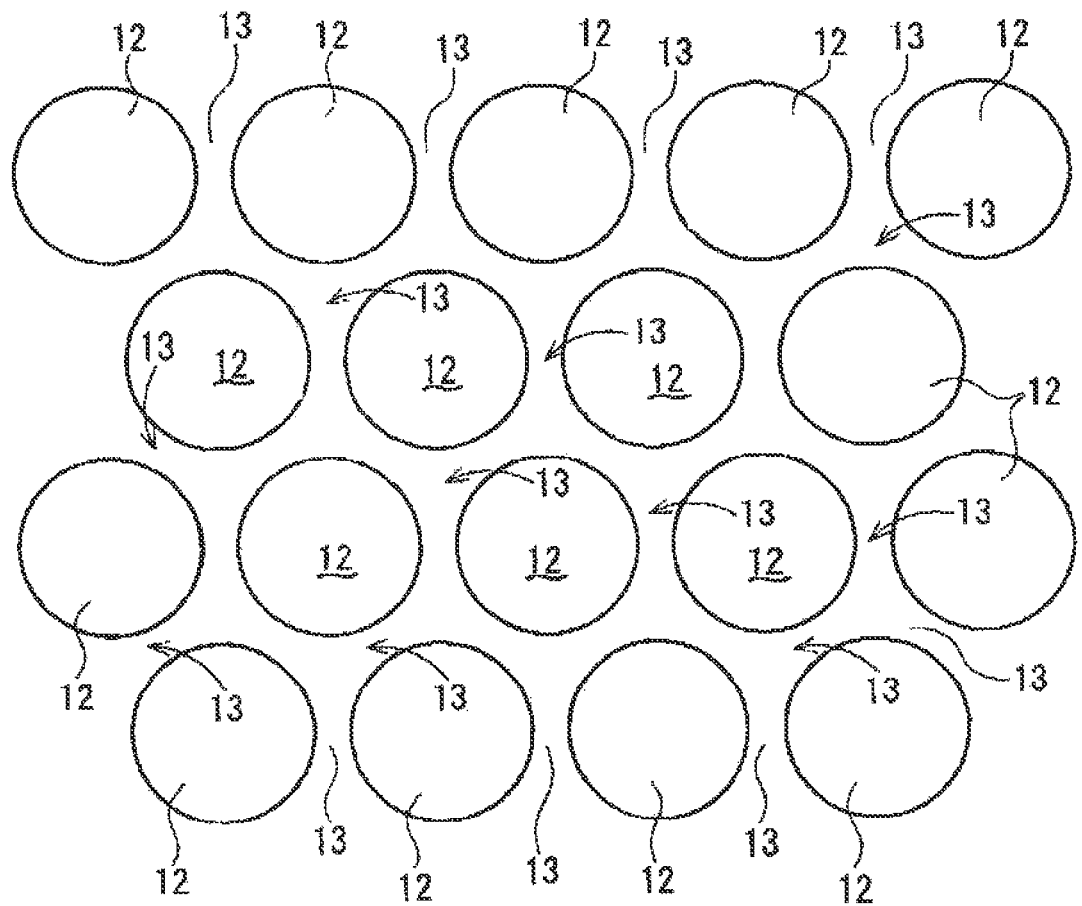
FIG. 6 is a plan view of a part of a bottom surface showing yet another configuration of the recessed and the ridge portion.

In FIG. 6, circular recessed holes 12 are arranged such that the centers of the respective circles are situated at the respective apexes of equilateral triangles and the portions between the recessed holes 12 constitute the ridge portions 13.

The diameter of each recessed hole 12 is preferably in the range of 10 to 40 mm, more preferably in the range of 15 to 30 mm. The thickness of the narrowest portion of the ridge portions 13 between the adjacent recessed holes 12 is preferably in the range of 2 to 20 mm, more preferably in the range of 4 to 10 mm. The preferable ranges of the opening area of each recessed hole 12, the height of each ridge portion 13 (the depth of each recessed hole 12) and the portion of the areas of top surfaces of the ridge portions 13, the preferable range of the volume rate of the ridge portions 13, the preferable material for the seat pad, and the like are similar to those described in the embodiment of FIGS. 1 to 3.

In a case where the ridge portions are continuously provided in three directions as shown in FIGS. 5 and 6, poor sitting comfort due to a wrong extending direction of the ridge portions is alleviated, as compared with a case where the ridge portions are continuously provided in two directions.

The seat pad for a vehicle, having the recessed holes and the ridge portions as shown in FIGS. 5 and 6, are molded by using a mold having a cavity surface, especially such a mold in which the bottom surface of a cavity is provided with projecting portions and recessed grooves of the shapes corresponding to the recessed holes and the ridge portions.

In a case where the ridge portions are provided continuously in three directions as shown in FIGS. 5 and 6, urethane raw liquid supplied to a portion of the bottom surface of a cavity flows between the aforementioned protruding portions and is easily distributed to every corner of the cavity. Specifically, in a case where the ridge portions are provided continuously in three directions as shown in FIGS. 5 and 6, urethane raw liquid flows through the recessed grooves for forming the ridge portions 11, 13 provided at the cavity surface (the bottom surface) of the mold, with meandering by approximately 60° with respect to the longitudinal direction, whereby urethane raw liquid easily flows between the projecting portions. In contrast, in the case shown in FIGS. 1 to 3 where urethane raw liquid flows with meandering by 90° with respect to the longitudinal direction, urethane raw liquid flows less easily than the case where urethane raw liquid meanders by 60° with respect to the longitudinal direction.

(Seat Back for Vehicle, in which Portions Other than Pelvis Contact Portion, of the Sitting Surface, are Made Soft by Recessed Holes)

Figure 7:
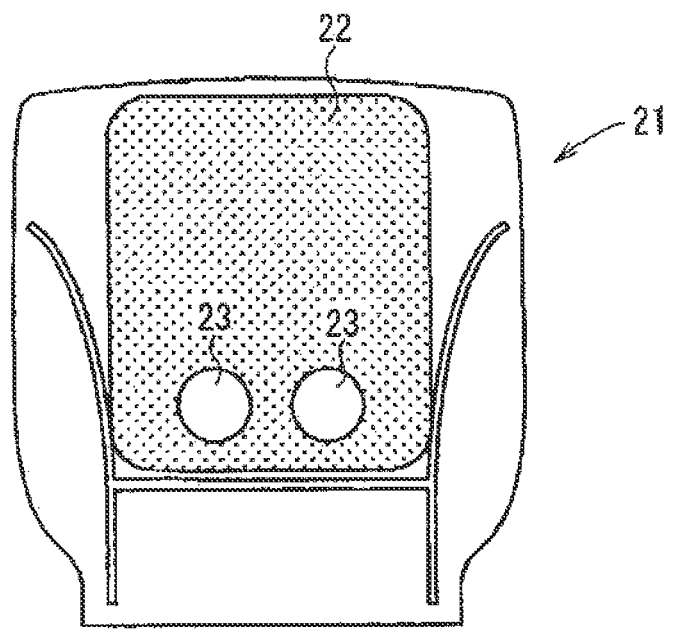
FIG. 7 is a plan view of a seat pad according to another embodiment of the present invention.

In the seat pad 21 of FIG. 7, the pelvis contact portion 23 is made flat to firmly support the pelvis, while other portions of the sitting surface 22 are made soft by the aforementioned protruding and recessed portions provided therein. Although each pelvis contact portion 23 is a circular region having a diameter of approximately 20 to 100 mm in FIG. 7, the pelvis contact region may be a square, polygonal, oval region or the like having substantially the same area as the circular region.

(Seat Pad for Vehicle, in which a Portion Under the Right Thigh Thereof is Made Soft by Recessed Holes)

Figure 8:
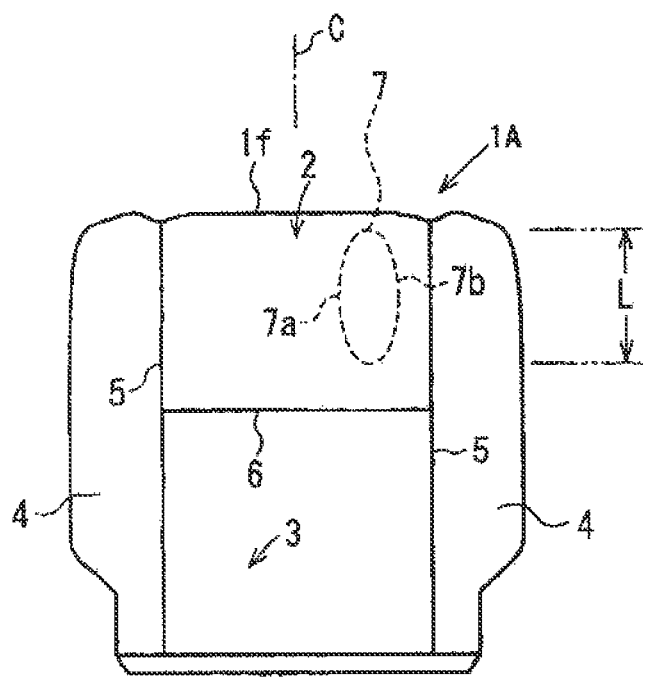
FIG. 8 is a plan view of a seat pad according to yet another embodiment of the present invention.

FIG. 8 is a plan view of a seat pad for the driver's seat in a vehicle according to an embodiment in which a portion under the right thigh of the seat pad is made soft by recessed holes.

In this seat pad 1A, the top surface of a portion under the right thigh 7 in the under-thighs portion 2 is provided with plural recessed holes and ridge portions. The portion under the right thigh 7 represents a region of the seat pad which an occupant's right thigh is in contact with when the occupant sits on the driver's seat. The side 7a on the left, of the under-right thigh portion 7, is normally distanced rightward from the center line C of the seat pad 1A by preferably 10 to 50 mm, more preferably 30 to 40 mm. The side 7b on the right, of the under-right thigh portion 7, is normally distanced rightward from the center line C of the seat pad 1A by preferably 100 to 200 mm, more preferably 120 to 150 mm. The width of the under-right thigh portion 7 in the left-right direction, i.e. the distance between the left side 7a and the right side 7b, is preferably in the range of 50 to 200 mm, more preferably in the range of 80 to 120 mm. The length L of the under-right thigh portion 7 in the front-rear direction is preferably in the range of 100 to 300 mm, more preferably in the range of 150 to 250 mm. The front end of the under-right thigh portion 7 is preferably located within 50 mm, more preferably within 5 to 30 mm, from the frontmost end 1f of the seat pad 1A.

In the present embodiment, the shapes, dimensions and the like of the recessed holes and the ridge portions may be any of those described above.

When an occupant sits on the seat pad 1A for the driver's seat structured as described above and the right thigh of the occupant is pressed against the under-right thigh portion 7, only the ridge portions are initially compression-deformed and the occupant feels soft sensation of touch. Accordingly, the sensation of touch, of the seat pad, felt by the right thigh when the brake or the accelerator is operated by the right foot is soft and satisfactory. As the right thigh sinks deeply and the ridge portions are further compression-deformed, the repellent force of the ridge portions increases strong enough to stably support the right thigh.

Although only the under-right thigh portion 7 is made soft in the present embodiment, it is acceptable that the under-thighs portion 2 as a whole is made softer than the under-buttocks portion 3 and the under-right thigh portion 7 is made further softer than the other portions of the under-thighs portion 2. The entire under-thighs portion 2 can be made soft by providing the recessed holes in the entire part of the under-thighs portion 2. The under-right thigh portion 7 can be made softer than the other portions of the under-thighs portion by increasing the depths of the recess holes and/or reducing the widths of the ridge portions.

(Seat Pad for Vehicle, in which the Front Portion Thereof is Made Soft by Recessed Holes)

Figure 9:
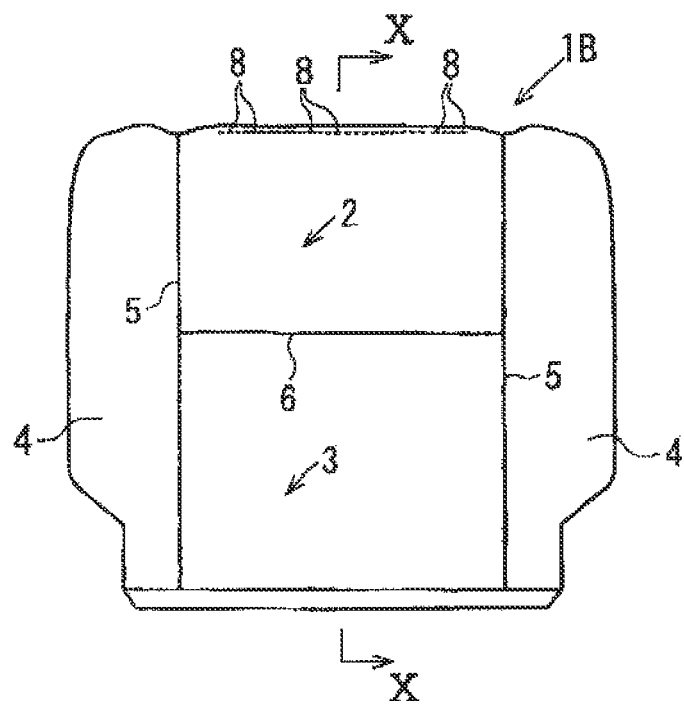
FIG. 9 is a plan view of a seat pad for a vehicle according to another embodiment of the present invention.
Figure 10:
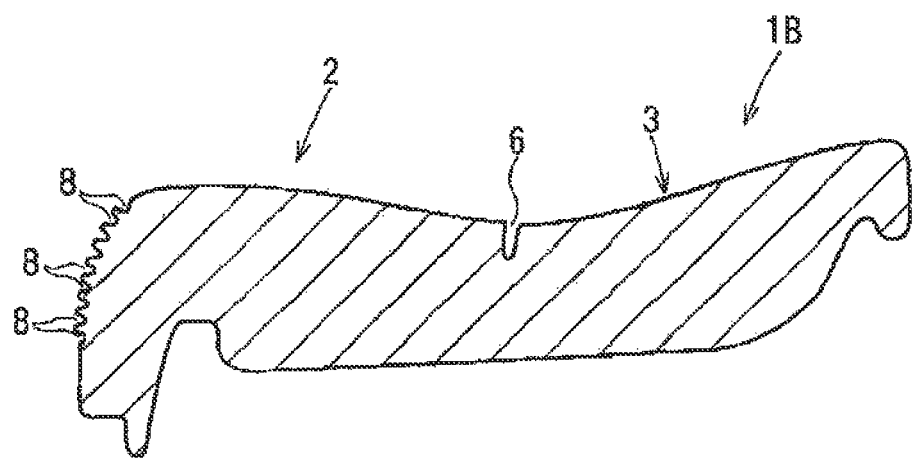
FIG. 10 is a sectional view cut along the line X-X of FIG. 9.
Figure 11:
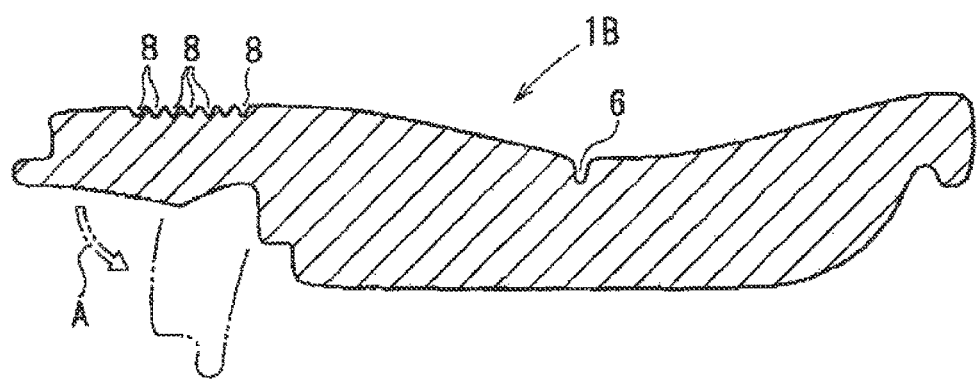
FIG. 11 is a sectional view of a seat pad blank of FIG. 9.
Figure 12:
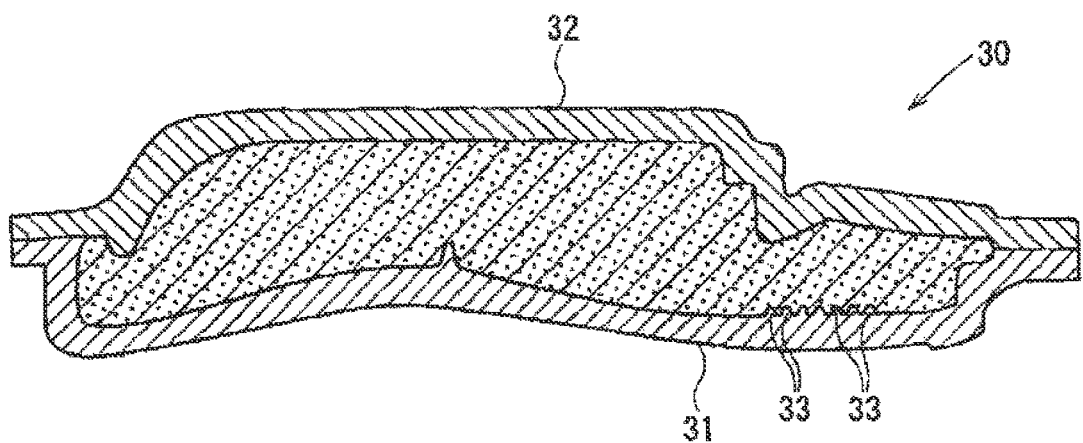
FIG. 12 is a sectional view of a mold for molding the seat pad of FIG. 9.

FIG. 9 is a plan view of a seat pad for a vehicle, in which the front portion of the seat pad is made soft by recessed holes provided therein. FIG. 10 is a sectional view cut along the line X-X of FIG. 9. FIG. 11 is a sectional view of a blank of the seat pad for a vehicle of FIG. 9. FIG. 12 is a sectional view of a mold for molding the seat pad of FIG. 9.

In the present embodiment, the front surface of the seat pad 1B is provided with plural recessed holes 8 and the ridge portions, so that the front surface of the seat pad 1B is easily compression-deformed. Accordingly, soft sensation of touch is obtained when the lower parts of legs of the occupant are in contact with the front surface. The front surface of the seat pad represents a vertical surface of which tangent line is inclined at least 50°, in particular, at least 70° with respect to the horizontal plane. The width in the left-right direction of a region where the recessed holes 8 are formed in the front surface is preferably in the range of 100 to 400 mm, more preferably in the range of 300 to 350 mm, and the width in the vertical direction of the region is preferably in the range of 30 to 100 mm, more preferably in the range of 50 to 70 mm.

In the present embodiment, the shapes, dimensions and the like of the recessed holes and the ridge portions may be any of those described above.

The seat pad 1B is manufactured by producing a blank thereof as shown in FIG. 11B by using a mold 30 shown in FIG. 12 and then bending the front portion of the seat pad blank downward as indicated by the arrow A.

The mold 30 includes an upper mold 31 and the lower mold 32. The bottom surface of a cavity of the lower mold 31 is provided with protruding portions 33 for forming the recessed holes 8. The recessed holes 8 of the seat pad blank are not hooked by the protruding portions 33 and can be smoothly released from the mold, thereby being prevented from damages, because the protruding portions 33 are provided to simply protrude upward from the bottom surface of the cavity. The protruding portions 33 may be mounted to the lower mold 31 in a detachable manner. The seat pad blank inside the mold 30 is positioned upside down, as compared with the seat pad as a finished product.

(Seat Pad for Vehicle, in which the Front and Sitting Surfaces are Provided with Recessed Holes, while a Corner Edge where these Surfaces Intersect Each Other Lacks Recessed Holes)

Figure 13:
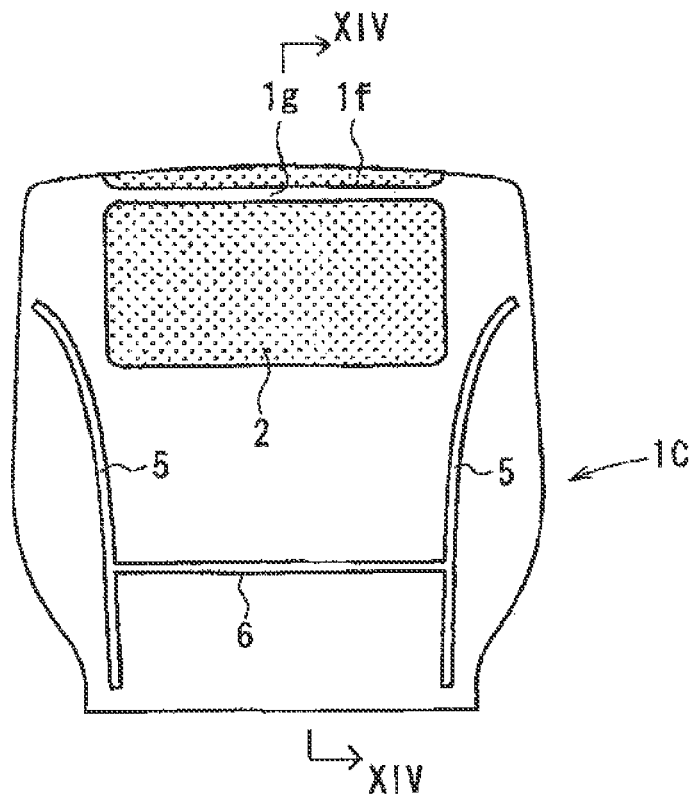
FIG. 13 is a plan view of a seat pad for a vehicle according to yet another embodiment of the present invention.
Figure 14:
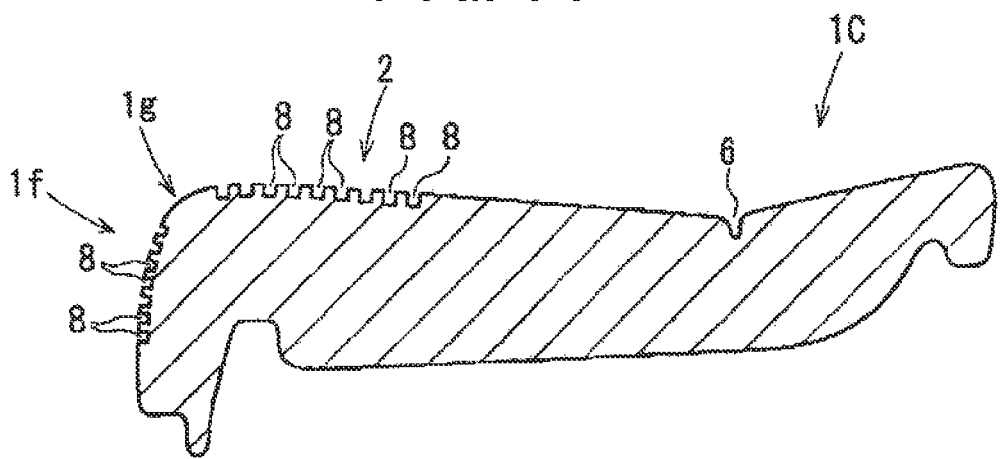
FIG. 14 is a sectional view cut along the line XIV-XIV of FIG. 13.
Figure 15:
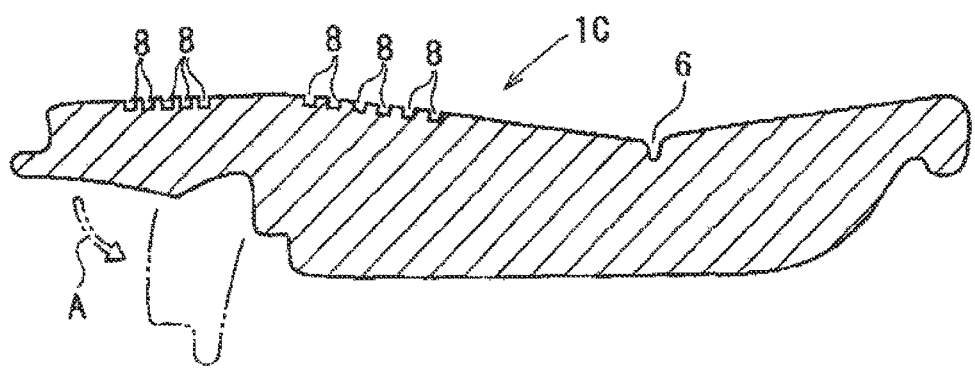
FIG. 15 is a sectional view of a seat pad blank of FIG. 13.
Figure 16:
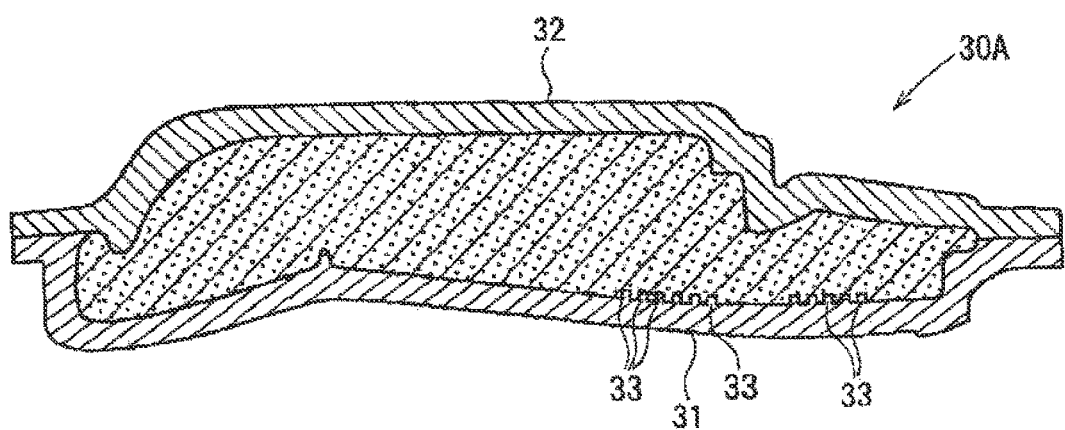
FIG. 16 is a sectional view of a mold for molding the seat pad of FIG. 13.

FIG. 13 is a plan view of a seat pad for a vehicle, in which the front and sitting surfaces of the seat pad are provided with recessed holes, while a corner edge where these surfaces intersect each other lacks recessed holes. FIG. 14 is a sectional view cut along the line XIV-XIV of FIG. 13. FIG. 15 is a sectional view of a blank of the seat pad for a vehicle of FIG. 13. FIG. 16 is a sectional view of a mold for molding the seat pad of FIG. 13.

In the present embodiment, the under-thighs portion 2 and the front surface 1f (the dotted regions in FIG. 13) of the seat pad 1C are provided with plural recessed holes 8, so that the under-thighs portion 2 and the front surface 1f are easily compression-deformed. Accordingly, soft sensation of touch is obtained when an occupant sits on the seat and his/her thighs are pressed against the under-thighs portion 2 and/or his/her lower legs hit the front surface 1f.

In the present embodiment, the recessed holes 8 are not formed in a corner edge 1g where the sitting surface and the front surface intersect each other. Accordingly, recessed holes are not reflected on a cover material in an engraved manner when the pad is covered with the cover material.

In a case where the corner edge portion 1g has a radius of curvature of not larger than 100 mm, in particular, not larger than 80 mm, e.g. 40 to 60 mm, and thus is strongly curved, it is prevented that recessed holes are reflected on the cover material in an engraved manner by not forming the recessed holes 8 in the corner edge region.

The front surface 1f of the seat pad corresponds to the vertical surface lower than the corner edge portion 1g and represents a region similar to the front surface in the embodiment of FIG. 9.

In the present embodiment, the shapes, dimensions and the like of the recessed holes and the ridge portions may be any of those described above.

The seat pad 1C is manufactured by producing a blank thereof as shown in FIG. 15 by using a mold 30A shown in FIG. 16 and then bending the front portion of the seat pad blank downward as indicated by the arrow A.

The mold 30A includes an upper mold 31 and the lower mold 32 as in the mold 30. The bottom surface of a cavity of the lower mold 31 is provided with projecting portions 33 for forming the recessed holes 8.

(Seat Pad for Vehicle, in which Satisfactory Sensation of the Pad Making a Stroke Movement is Obtained by Forming Recessed Holes in the Rear Surface of the Seat Pad)

In another embodiment of the seat pad for a vehicle of the present invention, plural recessed holes are formed at least in a part of the rear surface of the resin foam molding body, i.e. the rear surface opposite to the occupant contact surface. Satisfactory sensation of the pad making a stroke movement is obtained because the portions between the recessed holes are compression-deformed and the pad makes a stroke movement backward when an occupant sits on and leans against the occupant contact surface. For example, sensation of the pad making a stroke movement felt by the portions under thighs improves by forming the recessed holes in the rear surface below the under-thighs portion.

Figure 17:
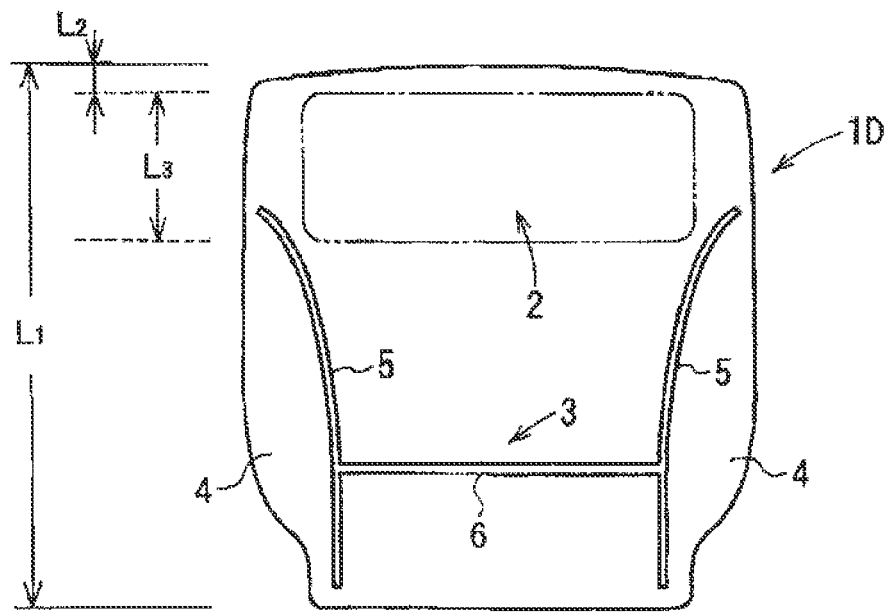
FIG. 17 is a plan view of a seat cushion pad for a vehicle according to an embodiment of the present invention.
Figure 18:
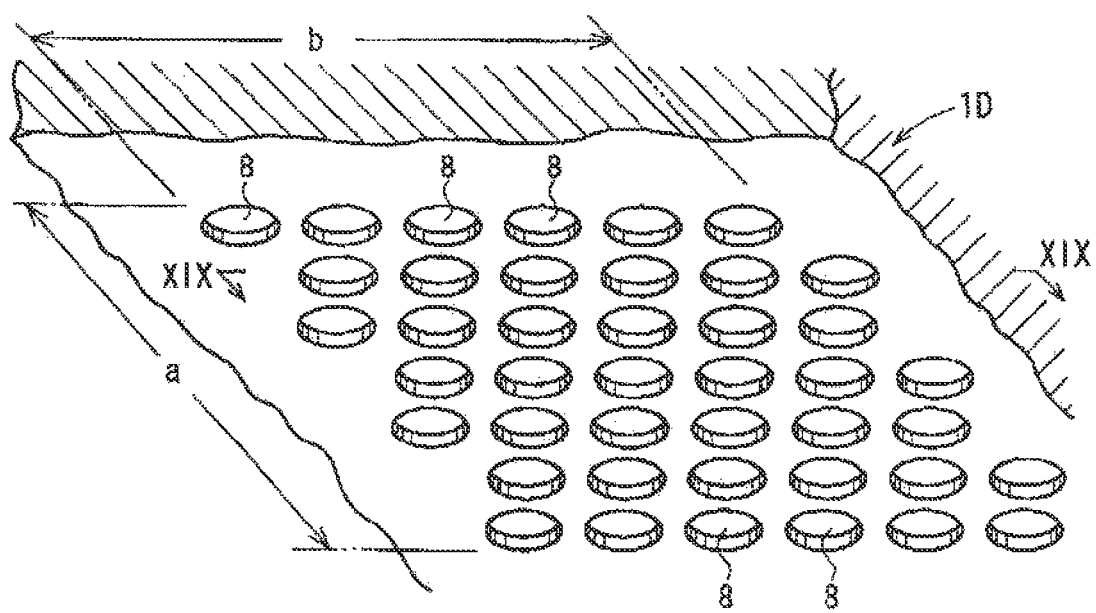
FIG. 18 is an enlarged perspective view of a bottom surface of the cushion pad.
Figure 19:
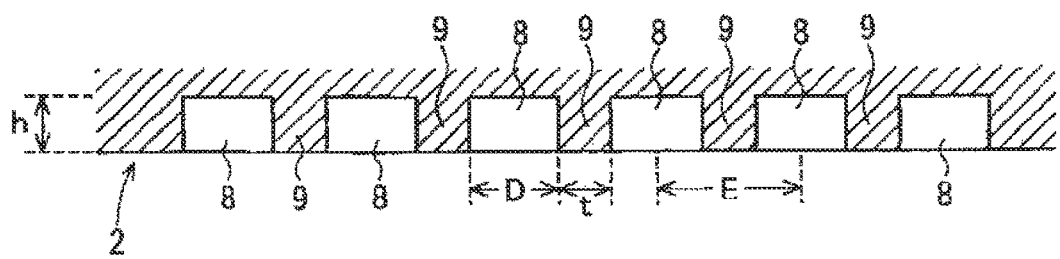
FIG. 19 is a sectional view cut along the line XIX-XIX of FIG. 18.

FIG. 17 is a plan view showing an example of a seat pad for a vehicle, having recessed holes in the rear surface of the occupant contact surface of the seat pad. FIG. 18 is an enlarged perspective view, from the down side, of the rear surface (the bottom surface of the pad) below the under-thighs portion of the seat pad. FIG. 19 is a sectional view cut along the line XIX-XIX of FIG. 18.

The seat pad 1D for a vehicle is a cushion pad formed of polyurethane foam, which is as a whole integrally foam molded. The seat pad 1D includes an under-thighs portion 2, an under-buttocks portion 3 and side portions 4 as in the foregoing embodiments.

In the upper surface of the seat pad 1D for a vehicle, longitudinal fitting grooves 5 and a lateral fitting groove 6 for fitting a cover material (not shown) are formed such that these grooves form a H-like configuration.

Plural recessed holes 8 are formed in the rear surface, i.e. the bottom surface of the seat pad 1D, below the under-thighs portion 2 so that the portions between the recessed holes 8 constitute the ridge portions 9. Provided that the entire length in the front-rear direction of the seat pad 1D is $L_1$, the distance between the front edge of a region where the recessed holes 8 and the ridge portions 9 are provided and the front end of the seat pad (the front end of the seat pad 1D in a plan view) is $L_2$, and the distance between the front edge and the rear edge of the region is $L_3$, $L_1$ is normally in the range of 550 to 650 mm, $L_2$ is preferably in the range of 5 to 100 mm, more preferably in the range of 10 to 50 mm, and $L_3$ is preferably in the range of 200 to 350 mm, more preferably in the range of 250 to 300 mm.

In the present embodiment, the shapes, dimensions and the like of the recessed holes and the ridge portions may be any of those described above.

When an occupant sits on the sitting surface of the seat pad 1D and the thighs of the occupant are in contact with the under-right thigh portion of the seat pad, mainly the ridge portions 9 are compression-deformed at the initial stage and then the entire part of the under-thighs portion of the seat pad 1D sinks downward almost evenly, whereby the occupant feels good sensation of the pad making a stroke movement. Thereafter, as the occupant's body further sinks in the seat and the ridge portions 9 are further compression-deformed, the repellent force of the ridge portions 9 increases strong enough to stably support the occupant's body.

Although the recessed holes 8 and the ridge portions 9 are provided in the rear surface of the seat pad below the under-thighs portion 2 in FIGS. 17 to 19, the recess holes and the ridge portions may be provided in both of the rear surfaces of the seat pad below the under-thighs portion 2 and the under-buttocks portion 3 or may be provided in either the rear surface of the seat pad below the under-thighs portion 2 or the rear surface of the seat pad below the under-buttocks portion 3.

Further, the rear surface of the seat pad below the pelvis contact portion 23 (see FIG. 7) may be made flat to firmly support the pelvis, while the rear surface of the seat pad below other portions of the sitting surface 22 may be provided with the recessed holes to enhance sensation of the pad making a stroke movement.

Figure 20:
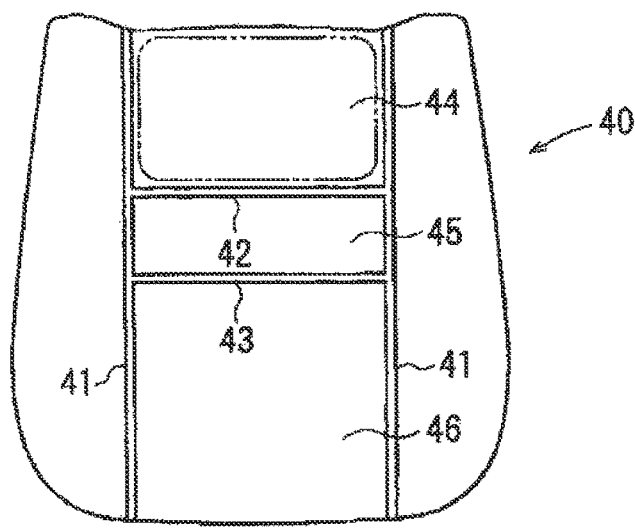
FIG. 20 is a front view of a back pad according to an embodiment of the present invention.

In the present invention, sensation of the pad making a stroke movement may be improved by forming recessed holes in the rear surface of a seat back pad. FIG. 20 is a front view of a seat back pad showing one example thereof. Cover fitting longitudinal grooves 41, 41 are formed to continuously extend in the vertical direction on the left and right hand sides of the front surface of a seat back pad 40. Cover fitting lateral grooves 42, 43 are formed to extend in the left-right direction and communicate with the cover fitting longitudinal grooves 41, 41. The recessed holes as any of those described above are formed in the rear surface of the seat back pad in a back contact region 44 above the upper cover fitting lateral groove 42, thereby improving sensation of the pad making a stroke movement in the back contact region 44. The recessed holes may also be formed in the rear surface of an intermediate region 45 below the back contact region 44. It is preferable not to form recessed holes in a lumbar contact portion 46 below the intermediate region 45, to improve the lumbar supporting properties.

The lower edge of the back contact region substantially corresponds with the cover fitting lateral groove 42. The distance between the lower edge of the back contact region and the sitting surface of the seat is preferably in the range of 250 to 500 mm, more preferably in the range of 300 to 400 mm. The distance between the upper edge of the back contact region and the upper end of the seat back pad 40 is preferably not larger than 100 mm and more preferably in the range of 20 to 50 mm or so.

(Seat for Vehicle, Including a Cushion Pad and a Back Pad Each Having Recessed Holes Formed Therein)

A seat for a vehicle according to an embodiment of the present invention includes a seat cushion pad and a seat back pad each having recessed holes formed therein.

Figure 21:
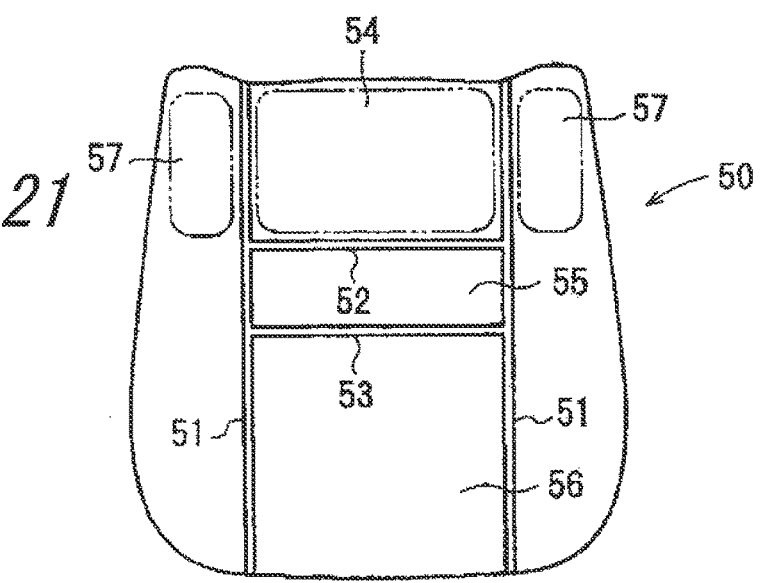
FIG. 21 is a front view of a back pad for a vehicle of an embodiment of the present invention.

FIG. 21 is a front view of a back pad of the seat for a vehicle of such an embodiment as described above.

Any of the seat cushion pads shown in FIGS. 1 to 16 may be used as the cushion pad of the seat for a vehicle of the present embodiment.

As shown in FIG. 21, cover fitting longitudinal grooves 51, 51 are formed to continuously extend in the vertical direction on the left and right hand sides of the front surface of a seat back pad 50. Cover fitting lateral grooves 52, 53 are formed to extend in the left-right direction and communicate with the cover fitting longitudinal grooves 51, 51. Recessed holes are formed in the front surface of a back contact portion 54 (defined by two-dot lines in FIG. 21) above the upper cover fitting lateral groove 52, to improve soft sensation of touch in the back contact portion.

The lower edge of the back contact portion 54 substantially corresponds with the cover fitting lateral groove 52. The distance between the lower edge of the back contact portion 54 and the sitting surface of the seat is preferably in the range of 250 to 500 mm, more preferably in the range of 300 to 400 mm. The distance between the upper edge of the back contact portion 54 and the upper end of the back pad 50 is preferably not larger than 100 mm and more preferably in the range of 20 to 50 mm or so.

Recessed holes may also be formed in a region 55 between the cover fitting lateral grooves 52 and 53. It is preferable not to form recessed holes in a lumbar supporting portion 56 below the cover fitting lateral groove 53.

The upper portions 57 (defined by two-dot lines in FIG. 21) of the side portions, i.e. the side regions of the back contact portion 54, may be made soft by forming recessed holes.

In the present embodiment, the shapes, the areas of an openings, and the like of the recessed holes may be any of those described above.

In the present embodiment, the recessed holes of the back pad is made deeper than the recessed holes of the cushion pad. Accordingly, the back pad is made softer than the cushion pad. The average depth of the recessed holes in the cushion pad is preferably in the range of 2 to 40 mm, more preferably in the range of 5 to 10 mm, and the average depth of the recessed holes in the back pad is preferably 2 to 20 times and more preferably 5 to 10 times as much as the average depth of the recessed holes in the cushion pad.

When an occupant sits on the sitting surface of the cushion pad of the vehicle seat as structured above and leans against the back contact portion of the back pad so that the thighs and the back of the occupant are in contact with the under-thighs portion and the back contact portion of the seat pad, respectively, mainly the ridge portions between the recessed holes are compression-deformed at the initial stage and the occupant feels soft sensation of touch. Then, as the ridge portions are further compression-deformed, the repellent force of the ridge portions increases and the occupant's body is stably supported.

The recessed holes are formed in the respective occupant contact surfaces of the cushion pad and the back pad in the embodiment of FIG. 21. However, recessed holes may be formed in the respective surfaces opposite to the occupant contact surfaces of the cushion pad and the back pad such that the recessed holes in the back pad are deeper than the recessed holes in the cushion pad. In this case, sensation of the pad making a stroke movement more improves in the back pad than in the cushion pad. In a case where recessed holes are formed in the surface opposite to the occupant contact area, the average depth of the recessed holes in the back pad is preferably 2 to 20 times and more preferably 5 to 10 times as much as the average depth of the recessed holes in the cushion pad.

EXAMPLES

Examples and Comparative Examples will be described hereinafter. For convenience, Comparative Example 1 will be described first.

Comparative Example

Figure 22:
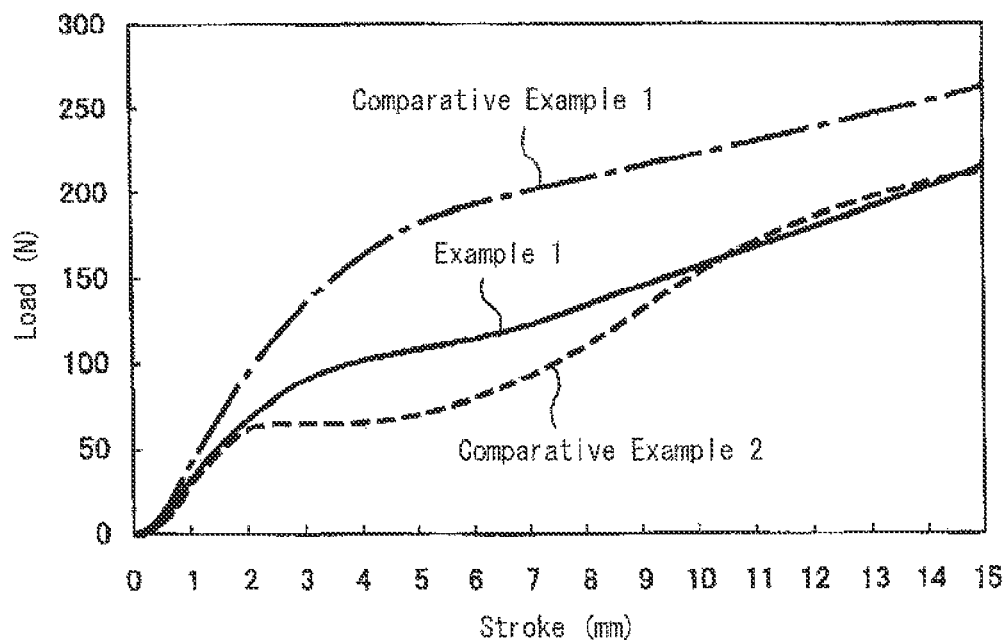
FIG. 22 is a graph showing the results of Example and Comparative Examples.

A seat pad formed of polyurethane foam having density of 64 kg/cm$^3$ and 25% hardness of 24 kgf/200 mm$\phi$ was prepared. No recessed holes 8 are formed in the seat pad. A load-stroke curve at the sitting surface of the seat pad was obtained. In the measurement of the load-stroke curve, a load applying means having diameter of 200 mm was pressed against the sitting surface at a rate of 0.8 mm/sec and the reaction force was measured. The result is shown in FIG. 22. The volume ratio of the ridge portions is 100% because no recessed holes are formed in the seat pad.

Example 1

A seat pad as shown in FIGS. 1 to 3 was produced by providing projecting portions in a surface (a cavity surface) for molding an under-thighs portion of a mold for use in molding of Comparative Example 1 and using the same urethane raw liquid as Comparative Example 1. The dimensions of w, t and h are 20 mm, 4 mm and 10 mm, respectively. The volume rate of the ridge portions 9 in Example 1 is 33.3%. The density and the 25% hardness of polyurethane are 64 kg/cm$^3$ and 19 kgf/200 mm$\phi$, respectively. A load applying means was pressed against the under-thighs portion of the seat pad in a manner similar to Comparative Example 1 and a load-stroke curve was obtained. The result is shown in FIG. 22.

Comparative Example 2

A seat pad main body was prepared in the same manner as in Comparative Example 1, except that the sitting surface was structured as a shallowly recessed portion of 10 mm depth.

Further, there was separately prepared a slab having thickness of 10 mm by using slab urethane foam having density of 64 kg/cm$^3$ and 25% ILD hardness of 24 kgf/200 mm$\phi$.

The slab thus prepared was attached to the recessed portion of the seat pad main body by an adhesive, whereby a seat pad was prepared. A load applying means was pressed against the seat pad in a manner similar to Comparative Example 1 and a load-stroke curve was obtained. The result is shown in FIG. 22.

(Consideration)

As shown in FIG. 22, the load-stroke curve of the seat pad of Example 1 resembles the load-stroke curve of the seat pad of Comparative Example 2 (the slab-attaching type). It is thus confirmed that the seat pad of the present invention is excellent in soft sensation of touch, of the surface thereof, and the properties of supporting the occupant's body.

In contrast, load significantly increases when a stroke exceeds approximately 1 mm in Comparative Example 1, as compared with Example 1 and Comparative Example 2. Accordingly, it is confirmed that the seat pad of Comparative Example 1 lacks soft sensation of touch.

Example 2

Figure 23:
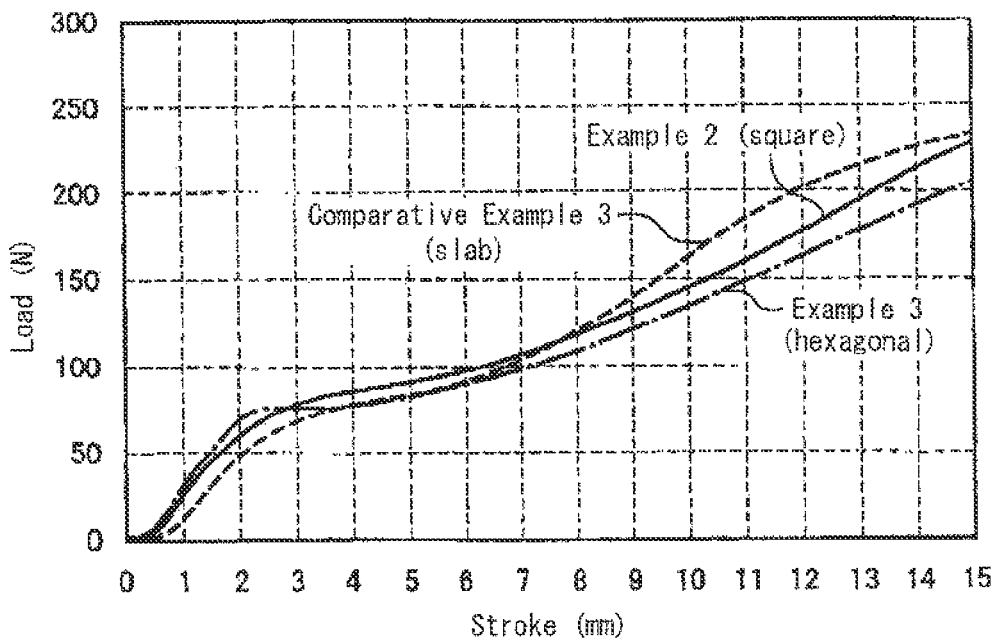
FIG. 23 is a graph showing the results of Examples and Comparative Example.

A seat pad as shown in FIGS. 1 to 3 was prepared by setting: the dimensions w, t and h at 26 mm, 4 mm and 10 mm, respectively; the ratio of areas of the ridge portions 9 in the total areas of the recessed holes 8 and the ridge portions 9 at 25%; the volume rate of the ridge portions 9 at 25%; and the density and the 25% hardness at 64 kg/cm$^3$ and 18 kgf/200 mmφ, respectively. A load applying means was pressed against the seat pad in a manner similar to Comparative Example 1 and a load-stroke curve was obtained. The result is shown in FIG. 23.

Example 3

A seat pad was prepared in the same manner as in Example 2, except that the recessed holes were structured as shown in FIG. 5. The length L of the largest diagonal line of the equilateral hexagon is 28 mm, t=4 mm and the depth h=10 mm. The volume rate of the ridge portions 11 is 25%. The measurement result of a load-stroke curve is shown in FIG. 23.

Comparative Example 3

A seat pad main body was prepared in the same manner as in Comparative Examples 2 and 3, except that the sitting surface was structured as a shallowly recessed portion of 10 mm depth.

Further, there was separately prepared a slab having thickness of 10 mm by using slab urethane foam having density of 30 kg/cm$^3$ and 25% ILD hardness of 7 kgf/200 mmφ.

The slab thus prepared was attached to the recessed portion of the seat pad main body by an adhesive, whereby a seat pad was prepared. A load-stroke curve of the seat pad was obtained. The result is shown in FIG. 23.

Examples 4 and 5, Comparative Example 4

Seat pad main body was prepared in the same manners as in Examples 2, 3 and Comparative Example 3, respectively, except that the density of the polyurethane foam was changed to 67 kg/m$^3$. A load-stroke curve was measured for each of Example 4, Example 5 and Comparative Example 4 thus performed in the same manner as the foregoing Examples. The results are shown in FIG. 24.

(Consideration)

As shown in FIG. 23, the load-stroke curves of the seat pads of Example 2 and Example 3 each resemble the load-stroke curve of the seat pad of Comparative Example 3 (the slab-attaching type). It is thus confirmed that the seat pads of the present invention are excellent in soft sensation of touch, of the surfaces thereof, and the properties of supporting the occupant's body.

Figure 24:
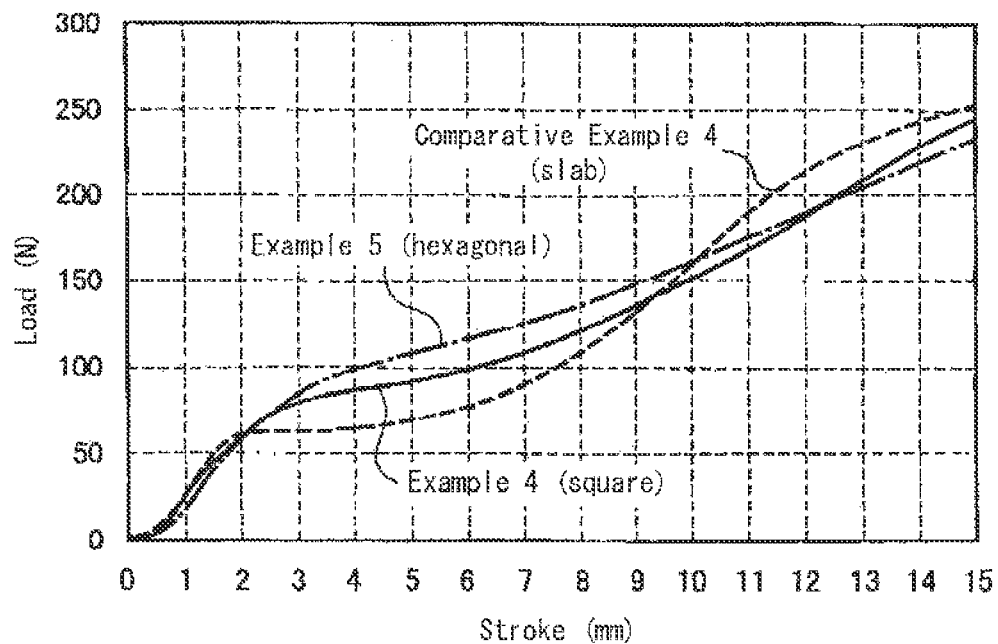
FIG. 24 is a graph showing the results of Examples and Comparative Example.

Further, as is obvious from FIG. 24, soft sensation of touch, of a seat pad surface, changes as the density of polyurethane foam changes, although the same configuration is maintained therein. Accordingly it is confirmed that soft sensation of touch, of a seat pad surface, can be adjusted by controlling the density and hardness of the pad.

Comparative Example 5

Figure 25:
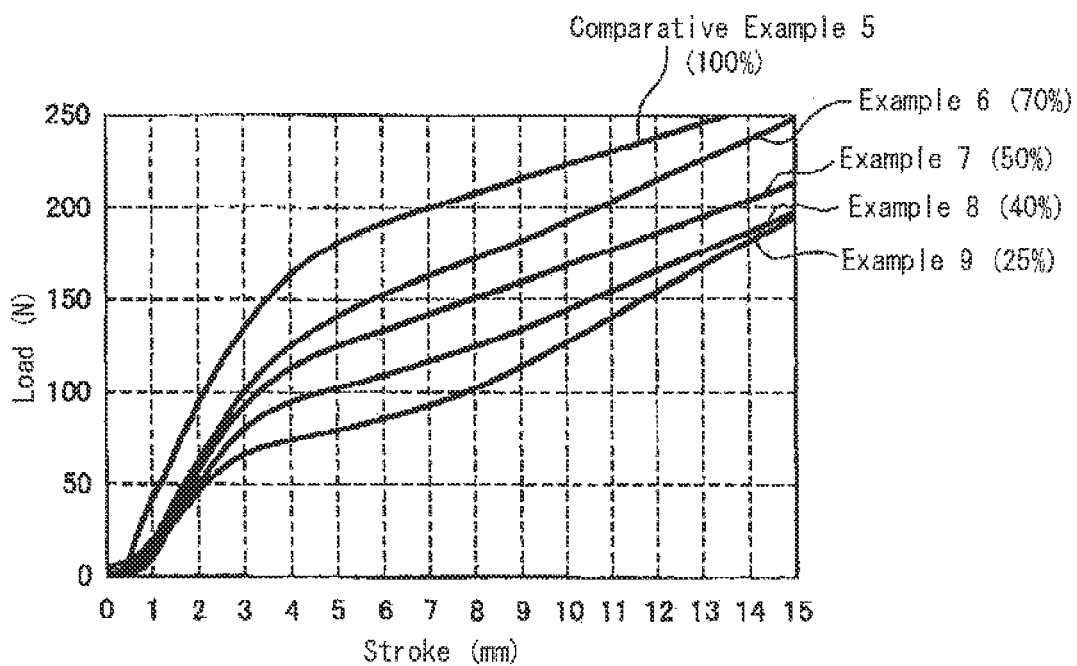
FIG. 25 is a graph showing the results of Examples and Comparative Example.

A seat pad was prepared by using polyurethane foam having density of 64 kg/cm$^3$ and 25% hardness of 24 kgf/200 mmφ. A load-stroke curve at the sitting surface of the seat pad was obtained in the same as in the foregoing Examples. The result is shown in FIG. 25. No recessed holes are formed in the seat pad. The volume rate of the ridge portions is 100% because no recess holes exist.

Example 6

A seat pad having a softened under-thighs portion was produced by using the same urethane raw liquid as Comparative Example 5 and providing projecting portions in a surface (a cavity surface) for molding an under-thighs portion of a mold for molding such that circular recessed holes as shown in FIG. 6 are formed in the under-thighs portion. The diameter, the depth, and the distance between the centers of adjacent recessed holes 12 were set at 12 mm, 5 mm, and 19 mm, respectively. The volume rate of the ridge portions 13 is 70%. A load applying means was pressed against the under-thighs portion of the seat pad in the same manner as in Comparative Example 5 to obtain a load-stroke curve. The result is shown in FIG. 25.

Example 7

A seat pad was prepared in the same manner as in Example 6, except that the diameter, the depth, and the distance between the centers of adjacent recessed holes 12 were set at 19 mm, 5 mm, and 26 mm, respectively, and the volume rate of the ridge portions 13 was 50%.

Example 8

A seat pad was prepared in the same manner as in Example 6, except that the diameter, the depth, and the distance between the centers of adjacent recessed holes 12 were set at 24 mm, 5 mm, and 30 mm, respectively, and the volume rate of the ridge portions 13 was 40%.

Example 9

A seat pad was prepared in the same manner as in Example 6, except that the diameter, the depth, and the distance between the centers of adjacent recessed holes 12 were set at 28 mm, 5 mm, and 32 mm, respectively, and the volume rate of the ridge portions 13 was 25%.

A load applying means was pressed against the under-right thigh portion of each of the seat pads of Examples 7 to 9 in the same manner as in Comparative Example 1 to obtain a load-stroke curve. The results are shown in FIG. 25.

(Consideration)

Figure 26:
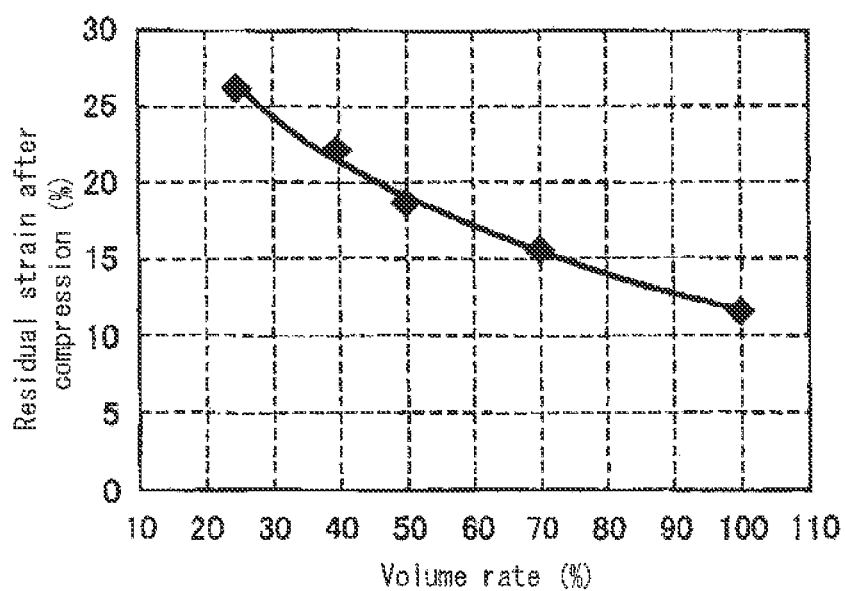
FIG. 26 is a graph showing the results of Examples and Comparative Examples.

As shown in FIG. 25, the under-right thigh portions of the seat pads of Examples 6 to 9 are softer than that of Comparative Example 5, respectively. Further, it is confirmed that the seat pad is made softer as the volume rate of the ridge portions drops. Residual strain after being subjected to 50% compression for 22 hours in a bath at 50° C. (constant) and humidity of 95% (constant) was measured for each of the under-thighs portions of the seat pads of Examples 6 to 9. The results are shown in FIG. 26.

Further, the corner edges of each ridge portion on the base end side and the tip end side were provided with curved surfaces (R=3.5 mm), respectively, in Example 7. It was confirmed that the residual strain after compression was then decreased from 19.8% to 18.8%.

The invention claimed is:
1. A seat pad formed by a resin foam molding, for use in a vehicle, comprising:
   an occupant-buttocks contact surface area;
   a rear surface area opposite to the occupant-buttocks contact surface area; and plural recessed holes formed in the rear surface area,
wherein portions between the recessed holes constitute ridge portions, and the seat pad is formed of polyurethane foam having density of 46 to 100 kg/m³, 25% ILD hardness of 15 to 45 kgf/200 mmϕ.

2. The seat pad for a vehicle of claim 1, wherein the recessed holes are formed at least in a bottom surface below an under-thighs portion.

3. A seat for a vehicle, having a cushion pad and a back pad constituted of the seat pad of claim 1, wherein recessed holes in the back pad are deeper than recessed holes in the cushion pad.

4. The seat pad for a vehicle of claim 3, wherein the recessed holes are formed at least in an under-thighs portion of the cushion pad and a back contact portion of the back pad.

5. The seat pad for a vehicle of claim 1, wherein the seat pad is formed of polyurethane foam having density of 50 to 100 kg/m³, 25% ILD hardness of 15 to 45 kgf/200 mmϕ.

* * * * *